United States Patent
Kasuga

(10) Patent No.: US 10,697,803 B2
(45) Date of Patent: Jun. 30, 2020

(54) MOTION DETECTING APPARATUS

(71) Applicant: Hirose Electric Co., Ltd., Tokyo (JP)

(72) Inventor: Atsushi Kasuga, Tokyo (JP)

(73) Assignee: HIROSE ELECTRIC CO., LTD., Tokyo (JP)

( * ) Notice: Subject to any disclaimer, the term of this patent is extended or adjusted under 35 U.S.C. 154(b) by 209 days.

(21) Appl. No.: 15/315,793

(22) PCT Filed: Jun. 5, 2015

(86) PCT No.: PCT/JP2015/066379
§ 371 (c)(1),
(2) Date: Dec. 2, 2016

(87) PCT Pub. No.: WO2016/002437
PCT Pub. Date: Jan. 7, 2016

(65) Prior Publication Data
US 2017/0115135 A1    Apr. 27, 2017

(30) Foreign Application Priority Data

Jun. 30, 2014   (JP) .................................. 2014-133957

(51) Int. Cl.
*G01C 9/00*      (2006.01)
*G01D 5/245*     (2006.01)
*G01D 5/244*     (2006.01)

(52) U.S. Cl.
CPC ......... *G01D 5/245* (2013.01); *G01D 5/24495* (2013.01)

(58) Field of Classification Search
CPC .......................... G01D 5/245; G01D 5/24495
(Continued)

(56) References Cited

U.S. PATENT DOCUMENTS

2013/0238278 A1 * 9/2013 Shoemaker ............ G01D 5/145
                                                                  702/145

FOREIGN PATENT DOCUMENTS

JP    2012-225917    11/2012
JP    2013-044606    3/2013
(Continued)

OTHER PUBLICATIONS

English translation of JP 2013044606, Mar. 4, 2013.*
(Continued)

*Primary Examiner* — Michael P Nghiem
(74) *Attorney, Agent, or Firm* — Rankin, Hill & Clark LLP

(57) ABSTRACT

To reduce information used for processes of complementing a missing detection pulse of a magnetic field detecting section, the apparatus carries out the processes of storing, as rotation direction information of a movable section 43, "rightward direction", "leftward direction", "unidentified" and "unidentified inversion", and setting the rotation direction information to "unidentified" when recognizing a missing detection pulse, and subsequently, adjusting a rotation change amount of the movable section using a first adjustment value if the rotation direction information becomes the "unidentified" and adjusting the rotation change amount of the movable section using a second adjustment value if the rotation direction information is updated from the "unidentified" to the "rightward direction" or the "leftward direction".

7 Claims, 10 Drawing Sheets

(58) Field of Classification Search
USPC .......................................................... 702/151
See application file for complete search history.

(56) References Cited

FOREIGN PATENT DOCUMENTS

| JP | 2014-048250 |   | 3/2014 |
|----|-------------|---|--------|
| JP | 2014-048251 |   | 3/2014 |
| JP | 2014-112113 |   | 6/2014 |
| JP | 2014112113  | * | 6/2014 |

OTHER PUBLICATIONS

English translation of JP 2014112113, Jun. 19, 2014.*
International Search Report, dated Aug. 18, 2015 (Aug. 18, 2015).

* cited by examiner

FIG. 7

| PROCESS No. | MOTION OF MOVABLE SECTION | PULSE COMPARISON VALUE IN CASE OF THREE SENSORS | PULSE COMPARISON VALUE IN CASE OF n SENSORS | LAST ROTATION DIRECTION INFORMATION | PRESENT ROTATION DIRECTION INFORMATION | ROTATION CHANGE AMOUNT IN CASE OF THREE SENSORS | ROTATION CHANGE AMOUNT IN CASE OF n SENSORS |
|---|---|---|---|---|---|---|---|
| P1 | ROTATION TO RIGHT | 1 | 1 | RIGHT | RIGHT | 1 | 1 |
| P2 | ROTATION TO LEFT | 5 | $2n-1$ | LEFT | LEFT | $-1$ | $-1$ |
| P3 | INVERSION FROM RIGHT TO LEFT | 3 | n | RIGHT | LEFT | $-3$ | $-n$ |
| P4 | INVERSION FROM LEFT TO RIGHT | 3 | n | LEFT | RIGHT | 3 | n |

FIG. 8

| PROCESS No. | MOTION OF MOVABLE SECTION | PULSE COMPARISON VALUE IN CASE OF THREE SENSORS | PULSE COMPARISON VALUE IN CASE OF n SENSORS | LAST ROTATION DIRECTION INFORMATION | PRESENT ROTATION DIRECTION INFORMATION | ROTATION CHANGE AMOUNT IN CASE OF THREE SENSORS | ROTATION CHANGE AMOUNT IN CASE OF n SENSORS |
|---|---|---|---|---|---|---|---|
| P5 | MISSING DURING ROTATION TO RIGHT | 2 | 2 | RIGHT | UNIDENTIFIED | -1 | $-(n-1)/2$ |
| P6 | MISSING DURING ROTATION TO LEFT | 4 | $2n-2$ | LEFT | UNIDENTIFIED | 1 | $(n-1)/2$ |
| P7 | MISSING JUST AFTER INVERSION FROM RIGHT TO LEFT | 2 | $n-1$ | RIGHT | UNIDENTIFIED | -1 | $-(n-1)/2$ |
| P8 | MISSING JUST AFTER INVERSION FROM LEFT TO RIGHT | 4 | $n+1$ | LEFT | UNIDENTIFIED | 1 | $(n-1)/2$ |
| P9 | ROTATION FROM UNIDENTIFIED STATE TO RIGHT | 1 | 1 | UNIDENTIFIED | RIGHT | 4 | $(n+5)/2$ |
| P10 | ROTATION FROM UNIDENTIFIED STATE TO LEFT | 5 | $2n-1$ | UNIDENTIFIED | LEFT | -4 | $-(n+5)/2$ |
| P11 | ROTATION FROM UNIDENTIFIED STATE TO LEFT | 3 | n | UNIDENTIFIED | UNIDENTIFIED INVERSION | 0 | 0 |
| P12 | ROTATION FROM UNIDENTIFIED STATE TO RIGHT | 3 | n | UNIDENTIFIED | UNIDENTIFIED INVERSION | 0 | 0 |
| P13 | ROTATION FROM UNIDENTIFIED INVERSION STATE TO RIGHT | 1 | 1 | UNIDENTIFIED INVERSION | RIGHT | 1 | $(n-1)/2$ |
| P14 | ROTATION FROM UNIDENTIFIED INVERSION STATE TO LEFT | 5 | $2n-1$ | UNIDENTIFIED INVERSION | LEFT | -1 | $-(n-1)/2$ |
| P15 | ROTATION FROM UNIDENTIFIED INVERSION STATE TO LEFT | 3 | n | UNIDENTIFIED INVERSION | UNIDENTIFIED | 0 | 0 |
| P16 | ROTATION FROM UNIDENTIFIED INVERSION STATE TO RIGHT | 3 | n | UNIDENTIFIED INVERSION | UNIDENTIFIED | 0 | 0 |

FIG. 9

| PROCESS No. | MOTION OF MOVABLE SECTION | PULSE COMPARISON VALUE IN CASE OF THREE SENSORS | PULSE COMPARISON VALUE IN CASE OF n SENSORS | LAST ROTATION DIRECTION INFORMATION | PRESENT ROTATION DIRECTION INFORMATION | ROTATION CHANGE AMOUNT IN CASE OF THREE SENSORS | ROTATION CHANGE AMOUNT IN CASE OF n SENSORS |
|---|---|---|---|---|---|---|---|
| P17 | MISSING JUST BEFORE INVERSION FROM LEFT TO RIGHT | 2 | $n-1$ | LEFT | RIGHT | 2 | $n-1$ |
| P18 | MISSING JUST BEFORE INVERSION FROM RIGHT TO LEFT | 4 | $n+1$ | RIGHT | LEFT | $-2$ | $-(n-1)$ |
| P19 | MISSING JUST AFTER INVERSION FROM UNIDENTIFIED STATE TO LEFT | 2 | $n-1$ | UNIDENTIFIED | LEFT | $-1$ | $-(n-1)-(n-1)/2$ |
| P20 | MISSING JUST AFTER INVERSION FROM UNIDENTIFIED STATE TO RIGHT | 4 | $n+1$ | UNIDENTIFIED | RIGHT | 1 | $n-1-(n-1)/2$ |
| P21 | MISSING DURING ROTATION FROM UNIDENTIFIED INVERSION STATE TO RIGHT | 2 | 2 | UNIDENTIFIED INVERSION | UNIDENTIFIED | $-1$ | $-1$ |
| P22 | MISSING JUST AFTER INVERSION FROM UNIDENTIFIED INVERSION STATE TO LEFT | 2 | $n-1$ | UNIDENTIFIED INVERSION | UNIDENTIFIED | $-1$ | $-1$ |
| P23 | MISSING DURING ROTATION FROM UNIDENTIFIED INVERSION STATE TO LEFT | 4 | $2n-2$ | UNIDENTIFIED INVERSION | UNIDENTIFIED | 1 | 1 |
| P24 | MISSING JUST AFTER INVERSION FROM UNIDENTIFIED INVERSION STATE TO RIGHT | 4 | $n+1$ | UNIDENTIFIED INVERSION | UNIDENTIFIED | 1 | 1 |
| P25 | MISSING JUST AFTER INVERSION FROM RIGHT TO LEFT AND INVERSION TO RIGHT JUST AFTER THAT | 0 | 0 | RIGHT | RIGHT | 0 | 0 |
| P26 | MISSING JUST AFTER INVERSION FROM LEFT TO RIGHT AND INVERSION TO LEFT JUST AFTER THAT | 0 | 0 | LEFT | LEFT | 0 | 0 |
| P27 | MISSING JUST AFTER INVERSION FROM UNIDENTIFIED STATE TO LEFT AND INVERSION TO RIGHT JUST AFTER THAT | 0 | 0 | UNIDENTIFIED | UNIDENTIFIED | 0 | 0 |
| P28 | MISSING JUST AFTER INVERSION FROM UNIDENTIFIED STATE TO RIGHT AND INVERSION TO LEFT JUST AFTER THAT | 0 | 0 | UNIDENTIFIED | UNIDENTIFIED | 0 | 0 |
| P29 | MISSING JUST AFTER INVERSION FROM UNIDENTIFIED INVERSION STATE TO LEFT AND INVERSION TO RIGHT JUST AFTER THAT | 0 | 0 | UNIDENTIFIED INVERSION | UNIDENTIFIED INVERSION | 0 | 0 |
| P30 | MISSING JUST AFTER INVERSION FROM UNIDENTIFIED INVERSION STATE TO RIGHT AND INVERSION TO LEFT JUST AFTER THAT | 0 | 0 | UNIDENTIFIED INVERSION | UNIDENTIFIED INVERSION | 0 | 0 |

MOTION DETECTING APPARATUS

TECHNICAL FIELD

The present invention relates to a motion detecting apparatus for detecting rotating motion or circulating motion of an object by using magnetism.

BACKGROUND ART

FIG. 13 shows, as an example of a conventional rotation detecting apparatus, a rotation detecting apparatus having the similar structure to a rotation detecting apparatus shown in FIG. 1 of Japanese Patent Laid-Open Publication No. 2013-44606 (Patent Document 1).

(Conventional Rotation Detecting Apparatus)

In FIG. 13, a rotation detecting apparatus 300 is an apparatus, for instance, which can detect a rotation direction and a rotation amount of a rotation shaft 301 of a servomotor provided in a movable portion of an industrial robot. The rotation detecting apparatus 300 comprises a movable section 302 fixed to the rotation shaft 301 and rotating according to rotation of the rotation shaft 301. A rotation direction and a rotation amount of the movable section 302 coincide with the rotation direction and the rotation amount of the rotation shaft 301.

In the movable section 302, four magnets 311, 312, 313 and 314 are provided. The magnets 311, 312, 313 and 314 are located in this order at intervals of 90 degrees in a leftward direction in a circumference direction of the movable section 302. In addition, the magnets 311 and 313 are located in such a way that N-poles are on their front sides, and the magnets 312 and 314 are located in such a way that S-poles are on their front side. According to this, magnetic fields whose directions change for every 90 degrees are generated at an outer circumference side of the movable section 302.

Moreover, in the vicinity of the movable section 302, three magnetic sensors 321, 322 and 323 are provided. Each of the magnetic sensors 321, 322 and 323 is formed by winding a coil around a composite magnetic wire, which is a magnetic element producing large Barkhausen effect. The magnetic sensors 321, 322 and 323 are located in this order in a rightward direction so as to be along a circular external shape of the movable section 302 and the interval of the magnetic sensors adjacent to each other is 30 degrees.

The magnets 311, 312, 313 and 314 are fixed to the movable section 302 and changes their positions according to rotation of the movable section 302, whereas the magnetic sensors 321, 322 and 323 are fixed to a not-shown supporting section or the like and are unmovable.

When the magnet 311 approaches the magnetic sensor 321 by the rotation of the movable section 302, a magnetization direction of the magnetic sensor 321 is inverted by the magnetic field generated by the magnet 311. By electromotive force generated at this time, a detection pulse (hereinafter, this is called as "positive directional detection pulse") whose level stands up in a positive direction is outputted from the magnetic sensor 321. The same goes for the time when the magnet 313 approaches the magnetic sensor 321. Also, the same goes for the magnetic sensors 322 and 323.

On the other hand, when the magnet 312 approaches the magnetic sensor 321 by the rotation of the movable section 302, the magnetization direction of the magnetic sensor 321 is inverted by the magnetic field generated by the magnet 312. By electromotive force generated at this time, a detection pulse (hereinafter, this is called as "negative directional detection pulse") whose level stands up in a negative direction is outputted from the magnetic sensor 321. The same goes for the time when the magnet 314 approaches the magnetic sensor 321. Also, the same goes for the magnetic sensors 322 and 323.

However, there is a case where the magnetization direction of the magnetic sensor 321 is not inverted even when the magnet 311, 312, 313 or 314 approaches the magnetic sensor 321. In this case, neither the positive directional detection pulse nor the negative directional detection pulse is outputted from the magnetic sensor 321. For instance, it is assumed that the movable section 302 is rotated in the rightward direction, the magnet 311 approaches the magnetic sensor 321, the magnetization direction of the magnetic sensor 321 is inverted, the positive directional detection pulse is outputted from the magnetic sensor 321, and then, the movable section 302 changes its rotation direction from the rightward direction to the leftward direction, and the magnet 311 approaches the magnetic sensor 321 again. In such a case, at the second time of approach of the magnet 311, neither the positive directional detection pulse nor the negative directional detection pulse is outputted from the magnetic sensor 321 because inversion of the magnetization direction of the magnetic sensor 321 does not occur. The same goes for the magnetic sensors 322 and 323. Hereinafter, a phenomenon that the magnetization direction of the magnetic sensor is not inverted at the second or more time of approach of the magnet in a case where the magnet producing the magnetic field in the same direction approaches the magnetic sensor continuously multiple times is expressed as "the magnetization direction is not inverted by addition of the magnetic field in the same direction".

In addition, the rotation detecting apparatus 300 comprises a rotation detecting circuit 330 for detecting the rotation direction and the rotation amount of the movable section 302 on the basis of the detection pulse outputted from each of the magnetic sensors 321, 322 and 323. The rotation detecting circuit 330 receives the positive directional detection pulses and the negative directional detection pulses respectively outputted from the magnetic sensors 321, 322 and 323. The rotation detecting circuit 330 assigns numbers to the positive directional detection pulses and the negative directional detection pulses respectively outputted from the magnetic sensors 321, 322 and 323. Concretely, "1" is assigned to the positive directional detection pulse outputted from the magnetic sensor 321, "2" is assigned to the positive directional detection pulse outputted from the magnetic sensor 322, and "3" is assigned to the positive directional detection pulse outputted from the magnetic sensor 323. Moreover, "4" is assigned to the negative directional detection pulse outputted from the magnetic sensor 321, "5" is assigned to the negative directional detection pulse outputted from the magnetic sensor 322, and "6" is assigned to the negative directional detection pulse outputted from the magnetic sensor 323. The rotation detecting circuit 330 carries out operation processing using the number assigned to each detection pulse to decide the rotation direction and the rotation amount of the movable section 302.

(Four Kinds of Normal Processes)

Hereinafter, four kinds of normal processes carried out by the rotation detecting circuit 330 in order to decide the rotation direction and the rotation amount of the movable section 302 will be explained.

Firstly, a first normal process is a process of deciding the rotation amount of the movable section 302 in a case where the movable section 302 is rotated in the rightward direction. The first normal process is as follows. For instance, the movable section 302 is rotated in the rightward direction by approximately 180 degrees. In the meantime, the magnet 311 approaches the magnetic sensors 321, 322 and 323 sequentially, and the magnetization directions of the magnetic sensors 321, 322 and 323 are inverted sequentially, and then, the magnet 312 approaches the magnetic sensors 321, 322 and 323 sequentially, and the magnetization directions of the magnetic sensors 321, 322 and 323 are inverted sequentially. In this case, an order of the numbers of the detection pulses outputted from the magnetic sensors 321, 322 and 323 becomes "1", "2", "3", "4", "5", "6". Thus, in the case where the movable section 302 is rotated in the rightward direction, the number of the outputted detection pulse is repeated in the order of "1", "2", "3", "4", "5", "6". On the basis of such regularity, the rotation detecting circuit 330 performs the following process as the first normal process. Namely, the rotation detecting circuit 330 increases the rotation amount by 1 in a case where a difference between the number of the detection pulse outputted from any one of the magnetic sensors 321, 322 and 323 last time and the number of the detection pulse outputted from any one of the magnetic sensors 321, 322 and 323 at the present time is 1 and the rotation direction when the detection pulse is outputted last time is the rightward direction. Incidentally, in a case where the number of the detection pulse outputted last time is "6" and the number of the detection pulse outputted at the present time is "1", the rotation detecting circuit 330 calculates the difference between both the numbers by 1 on the basis of the above-mentioned regularity. Incidentally, the first normal process is explained in detail in paragraphs 0127 to 0141, FIG. 7 and an upper stage of FIG. 8 of Patent Document 1.

Next, a second normal process is a process of deciding the rotation amount of the movable section 302 in a case where the movable section 302 is rotated in the leftward direction. The second normal process is as follows. For instance, the movable section 302 is rotated in the leftward direction by approximately 180 degrees. In the meantime, the magnet 314 approaches the magnetic sensors 323, 322 and 321 sequentially, and the magnetization directions of the magnetic sensors 323, 322 and 321 are inverted sequentially, and then, the magnet 313 approaches the magnetic sensors 323, 322 and 321 sequentially, and the magnetization directions of the magnetic sensors 323, 322 and 321 are inverted sequentially. In this case, an order of the numbers of the detection pulses outputted from the magnetic sensors 321, 322 and 323 becomes "6", "5", "4", "3", "2", "1". Thus, in the case where the movable section 302 is rotated in the leftward direction, the number of the outputted detection pulse is repeated in the order of "6", "5", "4", "3", "2", "1". On the basis of such regularity, the rotation detecting circuit 330 performs the following process as the second normal process. Namely, the rotation detecting circuit 330 decreases the rotation amount by 1 in a case where a difference between the number of the detection pulse outputted from any one of the magnetic sensors 321, 322 and 323 last time and the number of the detection pulse outputted from any one of the magnetic sensors 321, 322 and 323 at the present time is 1 and the rotation direction when the detection pulse is outputted last time is the leftward direction. Incidentally, in a case where the number of the detection pulse outputted last time is "1" and the number of the detection pulse outputted at the present time is "6", the rotation detecting circuit 330 calculates the difference between both the numbers by 1 on the basis of the above-mentioned regularity.

Next, a third normal process is a process of deciding the rotation direction and the rotation amount of the movable section 302 in a case where the movable section 302 changes the rotation direction from the rightward direction to the leftward direction. The third normal process is as follows. For instance, it is assumed that the movable section 302 is rotated in the rightward direction by approximately 90 degrees, in the meantime, the magnet 311 approaches the magnetic sensors 321, 322 and 323 sequentially and the magnetization directions of the magnetic sensors 321, 322 and 323 are inverted sequentially. It is assumed that, after that, the movable section 302 changes the rotation direction to the leftward direction and is rotated in the leftward direction by approximately 180 degrees, in the meantime, the magnet 311 approaches the magnetic sensors 323, 322 and 321 sequentially, but, in all of the magnetic sensors 321, 322 and 323, the magnetization direction is not inverted by addition of the magnetic field in the same direction, and subsequently, the magnet 314 approaches the magnetic sensors 323, 322 and 321 sequentially and the magnetization directions of the magnetic sensors 323, 322 and 321 are inverted sequentially. In this case, an order of the numbers of the detection pulses outputted from the magnetic sensors 321, 322 and 323 becomes "1", "2", "3", "6", "5", "4". A point to be noted here is that the number of detection pulse outputted at last before the rotation direction of the movable section 302 is changed is "3", the number of detection pulse outputted at first after the rotation direction of the movable section 302 is changed is "6", and the difference between these numbers is 3. Thus, if the movable section 302 changes the rotation direction, the difference between the numbers of the detection pulses before and after change of the rotation direction becomes 3. On the basis of such regularity, the rotation detecting circuit 330 performs the following process as the third normal process. Namely, the rotation detecting circuit 330 decides that the rotation direction of the movable section 302 is changed from the rightward direction to the leftward direction and decreases the rotation amount by 3 in a case where a difference between the number of the detection pulse outputted from any one of the magnetic sensors 321, 322 and 323 last time and the number of the detection pulse outputted from any one of the magnetic sensors 321, 322 and 323 at the present time is 3 and the rotation direction when the detection pulse is outputted last time is the rightward direction. Incidentally, the third normal process is explained in detail in paragraphs 0157 to 0168, FIG. 7 and an upper stage of FIG. 9 of Patent Document 1.

Finally, a fourth normal process is a process of deciding the rotation direction and the rotation amount of the movable section 302 in a case where the movable section 302 changes the rotation direction from the leftward direction to the rightward direction. The fourth normal process is the process carried out, for instance, in a case where the movable section 302 is rotated in the leftward direction by approximately 90 degrees, and then, changes the rotation direction to the rightward direction and is rotated in the rightward direction by approximately 180 degrees. That is, although the above-mentioned third normal process is the process carried out when the movable section 302 changes the rotation direction from the rightward direction to the leftward direction, the fourth normal process is the process carried out when the movable section 302 changes the rotation direction from the leftward direction to the rightward direction. As the fourth normal process, the rotation detecting circuit 330 decides that the rotation direction of the movable section 302 is changed from the leftward direction to the rightward direction and increases the rotation amount by 3, in a case where a difference between the number of the detection pulse outputted from any one of the magnetic sensors 321, 322 and 323 last time and the number of the detection pulse outputted from any one of the magnetic sensors 321, 322 and 323 at the present time is 3 and the rotation direction when the detection pulse is outputted last time is the leftward direction.

Incidentally, when the movable section 302 is rotated at first after the rotation detecting apparatus 300 starts operation, the rotation direction of the movable section 302 is decided, for instance, on the basis of whether a value obtained by subtracting the number of the detection pulse outputted from the magnetic sensor 321 from the number of the detection pulse outputted from the magnetic sensor 322 is positive or negative, and its result is stored as rotation direction information in a storage element provided in the rotation detecting circuit 330. Afterwards, whenever change of the rotation direction of the movable section 302 is recognized by the above-mentioned processes, the rotation direction information stored in the storage element is updated. The rotation detecting circuit 330 can know the rotation direction at the time when the detection pulse is outputted last time by reading the rotation direction information from the storage element.

(Missing of Detection Pulse)

The above-mentioned four normal processes in the rotation detecting circuit 330 are processes on the assumption that, when the magnetization direction of any one of the magnetic sensors 321, 322 and 323 is inverted, the detection pulse is invariably outputted from that magnetic sensor. However, in each of the magnetic sensors 321, 322 and 323, a situation that the detection pulse is not outputted regardless of inversion of the magnetization direction, i.e., missing of the detection pulse may be caused. In a case where the missing of the detection pulse occurs, it is impossible to correctly detect the rotation direction and the rotation amount of the movable section 302 in the above-mentioned normal processes.

Hereinafter, a situation that correct decision of the rotation direction and the rotation amount of the movable section 302 in the above-mentioned normal processes becomes impossible in the case where missing of the detection pulse occurs will be explained by using two operation examples of the rotation detecting apparatus 300.

Firstly, a first operation example is as follows. For instance, it is assumed that the movable section 302 is rotated in the rightward direction by approximately 150 degrees, in the meantime, the magnet 311 approaches the magnetic sensors 321, 322 and 323 sequentially, and the magnetization directions of the magnetic sensors 321, 322 and 323 are inverted sequentially, and then, the magnet 312 approaches the magnetic sensors 321 and 322 sequentially, and the magnetization directions of the magnetic sensors 321 and 322 are inverted sequentially. In this case, an order of the numbers of the detection pulses outputted from the magnetic sensors 321, 322 and 323 becomes "1", "2", "3", "4", "5". In this operation, it is assumed that the negative directional detection pulse (the number "4") to be outputted from the magnetic sensor 321 is missed. In this case, the order of the numbers of the detection pulses becomes "1", "2", "3", "5".

Next, a second operation example is as follows. For instance, it is assumed that the movable section 302 is rotated in the rightward direction by approximately 90 degrees, in the meantime, the magnet 311 approaches the magnetic sensors 321, 322 and 323 sequentially, and the magnetization directions of the magnetic sensors 321, 322 and 323 are inverted sequentially. Subsequently, it is assumed that the movable section 302 changes the rotation direction to the leftward direction, is rotated in the leftward direction by approximately 150 degrees, in the meantime, the magnet 311 approaches the magnetic sensors 323, 322 and 321 sequentially, but the magnetization directions of the magnetic sensors 321, 322 and 323 are not inverted by addition of the magnetic field in the same direction, and further, the magnet 314 approaches the magnetic sensors 323 and 322 sequentially, and the magnetization directions of the magnetic sensors 323 and 322 are inverted sequentially. In this case, an order of the numbers of the detection pulses outputted from the magnetic sensors 321, 322 and 323 becomes "1", "2", "3", "6", "5". In this operation, it is assumed that the negative directional detection pulse (the number "6") to be outputted from the magnetic sensor 323 is missed. In this case, the order of the numbers of the detection pulses becomes "1", "2", "3", "5".

By comparing the case where the negative directional detection pulse of the magnetic sensor 321 is missed in the first operation example to the case where the negative directional detection pulse of the magnetic sensor 323 is missed in the second operation example, it is understandable that the orders of the numbers of the detection pulses are the same. In this case, it is impossible to identify these two operations in the above-mentioned normal processes, and consequently, it is impossible to correctly decide the rotation direction and the rotation amount of the movable section 302.

(Missing Complementing Process)

The rotation detecting circuit 330 includes the function of carrying out processes (hereinafter, this is called as "missing complementing process") for complementing such missing of the detection pulse and correctly deciding the rotation direction and the rotation amount of the movable section 302. Hereinafter, three examples of the missing complementing process will be explained.

Firstly, a first example of the missing complementing process is an example of the missing complementing process in a case where the movable section 302 does not change the rotation direction. The first example of the missing complementing process is as follows. For instance, it is assumed that the movable section 302 is rotated in the rightward direction by approximately 180 degrees, in the meantime, the magnet 311 approaches the magnetic sensors 321, 322 and 323 sequentially, and the magnetization directions of the magnetic sensors 321, 322 and 323 are inverted sequentially, and then, the magnet 312 approaches the magnetic sensors 321, 322 and 323 sequentially, and the magnetization directions of the magnetic sensors 321, 322 and 323 are inverted sequentially. In this case, an order of the numbers of the detection pulses outputted from the magnetic sensors 321, 322 and 323 becomes "1", "2", "3", "4", "5", "6". In this operation, if the negative directional detection pulse (the number "4") to be outputted from the magnetic sensor 321 is missed, the order of the numbers of the detection pulses becomes "1", "2", "3", "5", "6".

In this case, the rotation detecting circuit 330 carries out the above-mentioned first normal process from the time when the detection pulse of the number "1" is outputted to the time when the detection pulse of the number "3" is outputted to increase the rotation amount of the movable section 302 by 1 for every time when the detection pulse is outputted. Subsequently, at the time when the detection pulse of the number "5" is outputted, the rotation detecting circuit 330 recognizes that missing of the detection pulse occurs during the time until the detection pulse of the number "5" is outputted after the detection pulse of the number "3" is outputted because a difference between the number "5" of the present detection pulse and the number "3" of the detection pulse outputted immediately before the present detection pulse is 2 and the difference is neither 1 nor 3. Further, at the time when the detection pulse of the number "5" is outputted, the rotation detecting circuit 330 does not change the rotation amount of the movable section 302. Next, at the time when the detection pulse of the number "6" is outputted, the rotation detecting circuit 330 subtracts the number "5" of the detection pulse outputted immediately before the present detection pulse from the number "6" of the present detection pulse and thereby obtains a value of 1, and therefore, decides that the rotation direction of the movable section 302 at the time when the detection pulse of the number "6" is outputted is the rightward direction. Further, at the time when the detection pulse of the number "6" is outputted, the rotation detecting circuit 330 subtracts the number "3" of the detection pulse (the detection pulse before last) outputted two times before the present detection pulse from the number "6" of the present detection pulse, and changes the rotation amount of the movable section 302 on the basis of a value obtained by this subtraction and the rotation direction of the movable section 302 at the time when the detection pulse of the number "6" is outputted.

Namely, in a case where the rotation direction of the movable section 302 is the rightward direction at the time when the decision of the rotation direction and the rotation amount is carried out (in this example, at the time when the detection pulse of the number "6" is outputted) and a case where a value obtained by subtracting the number of the detection pulse outputted two times before the present detection pulse from the present detection pulse outputted at the time when the decision of the rotation direction and the rotation amount is carried out is g (a positive value), the rotation amount of the movable section 302 is increased by g. Moreover, in the case where the rotation direction of the movable section 302 is the rightward direction at the time when the decision of the rotation direction and the rotation amount is carried out and a case where a value obtained by subtracting the number of the detection pulse outputted two times before the present detection pulse from the present detection pulse outputted at the time when the decision of the rotation direction and the rotation amount is carried out is –h (a negative value), the rotation amount of the movable section 302 is increased by (6–h) (6 used here is the number of kinds of the detection pulses). In this example, because the rotation direction of the movable section 302 is the rightward direction at the time when the decision of the rotation direction and the rotation amount is carried out, i.e., at the time when the detection pulse of the number "6" is outputted, and a value obtained by subtracting the number of the detection pulse outputted two times before the present detection pulse from the present detection pulse outputted at the time when the detection pulse of the number "6" is outputted is 3, the rotation detecting circuit 330 increases the rotation amount of the movable section 302 by 3. As mentioned above, if there is no missing of the negative directional detection pulse in the magnetic sensor 321, the order of the detection pulses becomes "1", "2", "3", "4", "5", "6" and the rotation amount of the movable section 302 rotated in the rightward direction during the time until the detection pulse of the number "6" is outputted after the detection pulse of the number "3" is outputted is increased by 3. From this, it is understandable that decision obtained by the missing complementing process of increasing the rotation amount of the movable section 302 by 3 is correct. Incidentally, the first example of the missing complementing process is explained in detail in paragraphs 0142 to 0156, FIG. 7 and a lower stage of FIG. 8 of Patent Document 1.

Next, a second example of the missing complementing process is an example of the missing complementing process in a case where the movable section 302 changes the rotation direction once. The second example of the missing complementing process is as follows. For instance, it is assumed that the movable section 302 is rotated in the rightward direction by approximately 90 degrees, in the meantime, the magnet 311 approaches the magnetic sensors 321, 322 and 323 sequentially, and the magnetization directions of the magnetic sensors 321, 322 and 323 are inverted sequentially. Subsequently, it is assumed that the movable section 302 changes the rotation direction to the leftward direction, is rotated in the leftward direction by approximately 180 degrees, in the meantime, the magnet 311 approaches the magnetic sensors 323, 322 and 321 sequentially, but the magnetization directions of the magnetic sensors 321, 322 and 323 are not inverted by addition of the magnetic field in the same direction, and further, the magnet 314 approaches the magnetic sensors 323, 322 and 321 sequentially, and the magnetization directions of the magnetic sensors 323, 322 and 321 are inverted sequentially. In this case, an order of the numbers of the detection pulses outputted from the magnetic sensors 321, 322 and 323 becomes "1", "2", "3", "6", "5", "4". In this operation, if the negative directional detection pulse (the number "6") to be outputted from the magnetic sensor 323 is missed, the order of the numbers of the detection pulses becomes "1", "2", "3", "5", "4".

In this case, the rotation detecting circuit 330 carries out the above-mentioned first normal process from the time when the detection pulse of the number "1" is outputted to the time when the detection pulse of the number "3" is outputted to increase the rotation amount of the movable section 302 by 1 for every time when the detection pulse is outputted. Subsequently, at the time when the detection pulse of the number "5" is outputted, the rotation detecting circuit 330 recognizes that missing of the detection pulse occurs during the time until the detection pulse of the number "5" is outputted after the detection pulse of the number "3" is outputted because a difference between the number "5" of the present detection pulse and the number "3" of the detection pulse outputted immediately before the present detection pulse is 2 and the difference is neither 1 nor 3. Further, at the time when the detection pulse of the number "5" is outputted, the rotation detecting circuit 330 does not change the rotation amount of the movable section 302. Next, at the time when the detection pulse of the number "4" is outputted, the rotation detecting circuit 330 subtracts the number "5" of the detection pulse outputted immediately before the present detection pulse from the number "4" of the present detection pulse and thereby obtains a value of –1, and therefore, decides that the rotation direction of the movable section 302 at the time when the detection pulse of the number "4" is outputted is the leftward direction. Further, at the time when the detection pulse of the number "4" is outputted, the rotation detecting circuit 330 subtracts the number "3" of the detection pulse (the detection pulse before last) outputted two times before the present detection pulse from the number "4" of the present detection pulse, and changes the rotation amount of the movable section 302 on the basis of a value obtained by this subtraction and the rotation direction of the movable section 302 at the time when the detection pulse of the number "4" is outputted.

Namely, in a case where the rotation direction of the movable section 302 is the leftward direction at the time when the decision of the rotation direction and the rotation amount is carried out (in this example, at the time when the detection pulse of the number "4" is outputted) and a case where a value obtained by subtracting the number of the detection pulse outputted two times before the present detection pulse from the present detection pulse outputted at the time when the decision of the rotation direction and the rotation amount is carried out is −i (a negative value), the rotation amount of the movable section 302 is decreased by i. Moreover, in the case where the rotation direction of the movable section 302 is the leftward direction at the time when the decision of the rotation direction and the rotation amount is carried out and a case where a value obtained by subtracting the number of the detection pulse outputted two times before the present detection pulse from the present detection pulse outputted at the time when the decision of the rotation direction and the rotation amount is carried out is j (a positive value), the rotation amount of the movable section 302 is decreased by (6−j) (6 used here is the number of kinds of the detection pulses). In this example, because the rotation direction of the movable section 302 is the leftward direction at the time when the decision of the rotation direction and the rotation amount is carried out, i.e., at the time when the detection pulse of the number "4" is outputted, and a value obtained by subtracting the number of the detection pulse outputted two times before the present detection pulse from the present detection pulse outputted at the time when the detection pulse of the number "4" is outputted is 1, the rotation detecting circuit 330 decreases the rotation amount of the movable section 302 by 5. As mentioned above, if there is no missing of the negative directional detection pulse in the magnetic sensor 323, the order of the detection pulses becomes "1", "2", "3", "6", "5", "4" and the rotation amount of the movable section 302 rotated in the leftward direction during the time until the detection pulse of the number "4" is outputted after the detection pulse of the number "3" is outputted is decreased by 5. From this, it is understandable that decision obtained by the missing complementing process of decreasing the rotation amount of the movable section 302 by 5 is correct. Incidentally, the second example of the missing complementing process is explained in detail in paragraphs 0169 to 0184, FIG. 7 and a lower stage of FIG. 9 of Patent Document 1.

Finally, a third example of the missing complementing process is an example of the missing complementing process in a case where the movable section 302 changes the rotation direction twice. The third example of the missing complementing process is as follows. For instance, it is assumed that the movable section 302 is rotated in the rightward direction by approximately 90 degrees, in the meantime, the magnet 311 approaches the magnetic sensors 321, 322 and 323 sequentially, and the magnetization directions of the magnetic sensors 321, 322 and 323 are inverted sequentially. Subsequently, it is assumed that the movable section 302 changes the rotation direction to the leftward direction, is rotated in the leftward direction by approximately 120 degrees, in the meantime, the magnet 311 approaches the magnetic sensors 323, 322 and 321 sequentially, but the magnetization directions of the magnetic sensors 321, 322 and 323 are not inverted by addition of the magnetic field in the same direction, and further, the magnet 314 approaches the magnetic sensor 323 and the magnetization direction of the magnetic sensor 323 is inverted. Subsequently, it is assumed that the movable section 302 changes the rotation direction to the rightward direction, is rotated in the rightward direction by approximately 150 degrees, in the mean- time, the magnet 314 approaches the magnetic sensor 323, but the magnetization direction of the magnetic sensor 323 is not inverted by addition of the magnetic field in the same direction, and further, the magnet 311 approaches the magnetic sensors 321 and 322 sequentially, but the magnetization directions of the magnetic sensors 321 and 322 are not inverted by addition of the magnetic field in the same direction, and furthermore, the magnet 311 approaches the magnetic sensor 323, and the magnetization direction of the magnetic sensor 323 is inverted, and moreover, the magnet 312 approaches the magnetic sensor 321, and the magnetization direction of the magnetic sensor 321 is inverted. In this case, an order of the numbers of the detection pulses outputted from the magnetic sensors 321, 322 and 323 becomes "1", "2", "3", "6", "3", "4". In this operation, if the positive directional detection pulse (the number "3") to be outputted from the magnetic sensor 323 at first time is missed, the order of the numbers of the detection pulses becomes "1", "2", "6", "3", "4".

In this case, the rotation detecting circuit 330 carries out the above-mentioned first normal process from the time when the detection pulse of the number "1" is outputted to the time when the detection pulse of the number "2" is outputted to increase the rotation amount of the movable section 302 by 1 for every time when the detection pulse is outputted. Subsequently, at the time when the detection pulse of the number "6" is outputted, the rotation detecting circuit 330 recognizes that missing of the detection pulse occurs during the time until the detection pulse of the number "6" is outputted after the detection pulse of the number "2" is outputted because a difference between the number "6" of the present detection pulse and the number "2" of the detection pulse outputted immediately before the present detection pulse is 4 and the difference is neither 1 nor 3. Further, at the time when the detection pulse of the number "6" is outputted, the rotation detecting circuit 330 does not change the rotation amount of the movable section 302. Next, at the time when the detection pulse of the number "3" is outputted, the rotation detecting circuit 330 subtracts the number "6" of the detection pulse outputted immediately before the present detection pulse from the number "3" of the present detection pulse and obtains a value of neither 1 nor −1, and subsequently, the rotation detecting circuit 330 subtracts the number "2" of the detection pulse outputted two times before the present detection pulse from the number "3" of the present detection pulse and obtains a value of 1, and therefore, decides that the rotation direction of the movable section 302 at the time when the detection pulse of the number "3" is outputted is the rightward direction (about this deciding step, refer to steps S7 and S9 in FIG. 7 of Patent Document 1). Further, at the time when the detection pulse of the number "3" is outputted, the rotation detecting circuit 330 subtracts the number "2" of the detection pulse outputted two times before the present detection pulse from the number "3" of the present detection pulse, and changes the rotation amount of the movable section 302 on the basis of a value obtained by this subtraction and the rotation direction of the movable section 302 at the time when the detection pulse of the number "3" is outputted. Namely, because the rotation direction of the movable section 302 is the rightward direction at the time when the detection pulse of the number "3" is outputted and a value obtained by subtracting the number of the detection pulse outputted two times before the present detection pulse from the present detection pulse outputted at the time when the detection pulse of the number "3" is outputted is 1, the rotation detecting circuit 330 increases the rotation amount of the movable section 302 by 1. As mentioned above, if there is no missing of the positive directional detection pulse in the magnetic sensor 323, the order of the detection pulses becomes "1", "2", "3", "6", "3", "4" and the rotation amount of the movable section 302 rotated in the leftward direction and then rotated in the rightward direction during the time until the detection pulse of the number "3" is outputted at second time after the detection pulse of the number "2" is outputted is increased by 1. From this, it is understandable that decision obtained by the missing complementing process of decreasing the rotation amount of the movable section 302 by 1 is correct. Incidentally, the third example of the missing complementing process is explained in detail in paragraphs 0197 to 0212, FIG. 7 and a lower stage of FIG. 10 of Patent Document 1.

By such missing complementing processes, it is possible to improve detection accuracy of the rotation direction and the rotation amount of the rotation shaft 301 (the movable section 302). More detail contents of the rotation detecting apparatus 300 according to conventional technique is described in Patent Document 1.

SUMMARY OF INVENTION

Problems to be Solved by the Invention

The rotation detecting circuit 330 of the above-mentioned rotation detecting apparatus 300 (the rotation detecting apparatus described in Patent Document 1) is provided with the storage element, and a part of a storage area of the storage element is used for storing information required to carry out processes of deciding the rotation direction and the rotation amount of the movable section 302.

There is a request to extend the storage area usable for other processes in this storage element. In order to comply with this request, it is desired that information required to carry out the processes of deciding the rotation direction and the rotation amount of the movable section 302 is reduced and the storage area of the storage element used for these processes is reduced.

All of the above-mentioned first to fourth normal processes are processes of deciding the rotation direction and the rotation amount of the movable section 302. The first to fourth normal processes are carried out by using the following three information: the number of the detection pulse outputted last time, the rotation direction of the movable section 302 at the time when the detection pulse is outputted last time, and the rotation amount of the movable section 302 at the time when the detection pulse is outputted last time. Therefore, the rotation detecting circuit 330 stores these three information in the storage element. Moreover, The missing complementing processes are carried out by using the following information: the number of the detection pulse outputted two times before, and information whether or not there is missing of the detection pulse, in addition to the three information used in the first to fourth normal processes. Therefore, the rotation detecting circuit 330 stores these two information in the storage element.

As a result of consideration whether or not there is information that can be removed among a total of five information as mentioned above in order to reduce the storage area of the storage element used for the processes of deciding the rotation direction and the rotation amount of the movable section 302, it is found to be difficult to remove the three information used in the first to fourth normal processes because those information are basic information for carrying out rotation detection of the movable section 302. Therefore, information proposed for removal is two remaining information used for only the missing complementing processes, i.e., the number of the detection pulse outputted two times before and information whether or not there is missing of the detection pulse. However, unless a method of the above-mentioned missing complementing processes is changed, it is impossible to remove these two information and it is not easy to devise another method of the missing complementing process.

The present invention is provided in view of the above-mentioned problems and a first object of the present invention is provision of a motion detecting apparatus capable of reducing information used for processes of complementing missing of a detection pulse of a magnetic field detecting section.

A second object of the present invention is provision of a motion detecting apparatus capable of complementing missing of a detection pulse of a magnetic field detecting section without using a detection pulse outputted two times before.

Means for Solving the Problem

In order to solve the above-mentioned objects, a first motion detecting apparatus of the present invention is a motion detecting apparatus for detecting rotating motion or circulating motion of a detected object characterized by comprising: a movable section rotating or circulating according to the rotating motion or the circulating motion of the detected object; at least one pair of magnetic field generating sections located in one of the movable section and the vicinity of the movable section to respectively generate magnetic fields different in direction each other; n magnetic field detecting sections (n is an integer 3 or more) located in another of the movable section and the vicinity of the movable section, in each of which a magnetization direction is changed when one of said one pair of magnetic field generating sections approaches and a positive detection pulse is outputted according to this change, and the magnetization direction is changed when another of said one pair of magnetic field generating sections approaches and a negative detection pulse is outputted according to this change; and a motion detecting circuit having a storage section, an operation processing section and an update processing section, receiving the detection pulse outputted from each of the magnetic field detecting sections, and detecting a state of the rotating motion or the circulating motion of the detected object on the basis of this received detection pulse, wherein said at least one pair of magnetic field generating sections and the n magnetic field detecting sections are located so that detection pulses in respective one of the positive direction and the negative direction are continuously outputted one by one at different timings from the respective n magnetic field detecting sections while the movable section rotates one direction (the positive or negative directions of respective n detection pulses outputted in this meantime are not always the same as each other), and subsequently, detection pulses in respective another of the positive direction and the negative direction are continuously outputted one by one at different timings from the respective n magnetic field detecting sections while the movable section further rotates one direction (the positive or negative directions of the respective n detection pulses outputted in this meantime are not always the same as each other), and thereby, a constant output pattern composed of a total of 2n detection pulses being different in combination of an output source and the positive or negative direction is formed, the operation processing section assigns numbers of 1, 2, . . . , n, n+1, n+2, . . . , 2n to the 2n detection pulses forming the output pattern in this order, the storage section stores the number of the detection pulse outputted last time from any one of the n magnetic field detecting sections, motion direction information indicating which of one direction, another direction, unidentified and inversion in an unidentified state (hereinafter, this is called as unidentified inversion) a motion direction of the movable section at the time when this last detection pulse is outputted is, and a motion amount detection value indicating a motion amount of the movable section at the time when this last detection pulse is outputted, the operation processing section decides, on the basis a difference between the number of the detection pulse outputted at the present time from any one of the n magnetic field detecting sections and the last detection pulse stored in the storage section, and the motion direction information and the motion amount detection value stored in the storage section, which of one direction, another direction, unidentified and unidentified inversion the motion direction of the movable section at the time when this present detection pulse is outputted is, and decides or sets the motion amount of the movable section at the time when this present detection pulse is outputted, the update processing section updates the number of the last detection pulse stored in the storage section on the basis of the number of the present detection pulse, updates the motion direction information stored in the storage section on the basis of decision executed by the operation processing section with respect to the motion direction of the movable section at the time when the present detection pulse is outputted, and updates the motion amount detection value stored in the storage section on the basis of decision or set executed by the operation processing section with respect to the motion amount of the movable section at the time when the present detection pulse is outputted.

Moreover, a second motion detecting apparatus of the present invention is, in the above-mentioned first motion detecting apparatus of the present invention, characterized in that the operation processing section calculates a value obtained by subtracting the number of the last detection pulse from the number of the present detection pulse (if the obtained value is a negative value, a value is taken by adding 2n to the obtained value) as a comparison value, decides, if the comparison value is 1 and the motion direction information indicates one direction, that the motion direction of the movable section at the time when the present detection pulse is outputted is one direction and a change value of the motion amount of the movable section at the time when the present detection pulse is outputted is +1, decides, if the comparison value is 2n−1 and the motion direction information indicates another direction, that the motion direction of the movable section at the time when the present detection pulse is outputted is another direction and the change value of the motion amount of the movable section at the time when the present detection pulse is outputted is −1, decides, if the comparison value is n and the motion direction information indicates one direction, that the motion direction of the movable section at the time when the present detection pulse is outputted is another direction and the change value of the motion amount of the movable section at the time when the present detection pulse is outputted is −n, decides, if the comparison value is n and the motion direction information indicates another direction, that the motion direction of the movable section at the time when the present detection pulse is outputted is one direction and the change value of the motion amount of the movable section at the time when the present detection pulse is outputted is +n, decides, if the comparison value is 2 and the motion direction information indicates one direction, that the motion direction of the movable section at the time when the present detection pulse is outputted is unidentified and sets the change value of the motion amount of the movable section at the time when the present detection pulse is outputted to −(n−1)/2, decides, if the comparison value is n−1 and the motion direction information indicates one direction, that the motion direction of the movable section at the time when the present detection pulse is outputted is unidentified and sets the change value of the motion amount of the movable section at the time when the present detection pulse is outputted to −(n−1)/2, decides, if the comparison value is 2n−2 and the motion direction information indicates another direction, that the motion direction of the movable section at the time when the present detection pulse is outputted is unidentified and sets the change value of the motion amount of the movable section at the time when the present detection pulse is outputted to (n−1)/2, decides, if the comparison value is n+1 and the motion direction information indicates another direction, that the motion direction of the movable section at the time when the present detection pulse is outputted is unidentified and sets the change value of the motion amount of the movable section at the time when the present detection pulse is outputted to (n−1)/2, decides, if the comparison value is 1 and the motion direction information indicates unidentified, that the motion direction of the movable section at the time when the present detection pulse is outputted is one direction and sets the change value of the motion amount of the movable section at the time when the present detection pulse is outputted to (n+5)/2, and decides, if the comparison value is 2n−1 and the motion direction information indicates unidentified, that the motion direction of the movable section at the time when the present detection pulse is outputted is another direction and sets the change value of the motion amount of the movable section at the time when the present detection pulse is outputted to −(n+5)/2.

Moreover, a third motion detecting apparatus of the present invention is, in the above-mentioned second motion detecting apparatus of the present invention, characterized in that the operation processing section decides, if the comparison value is n and the motion direction information indicates unidentified, that the motion direction of the movable section at the time when the present detection pulse is outputted is unidentified inversion and sets the change value of the motion amount of the movable section at the time when the present detection pulse is outputted to 0, decides, if the comparison value is 1 and the motion direction information indicates unidentified inversion, that the motion direction of the movable section at the time when the present detection pulse is outputted is one direction and sets the change value of the motion amount of the movable section at the time when the present detection pulse is outputted to (n−1)/2, decides, if the comparison value is 2n−1 and the motion direction information indicates unidentified inversion, that the motion direction of the movable section at the time when the present detection pulse is outputted is another direction and sets the change value of the motion amount of the movable section at the time when the present detection pulse is outputted to −(n−1)/2, and decides, if the comparison value is n and the motion direction information indicates unidentified inversion, that the motion direction of the movable section at the time when the present detection pulse is outputted is unidentified and sets the change value of the motion amount of the movable section at the time when the present detection pulse is outputted to 0.

Moreover, a fourth motion detecting apparatus of the present invention is, in the above-mentioned third motion detecting apparatus of the present invention, characterized in that the operation processing section decides, if the comparison value is 2 and the motion direction information indicates unidentified inversion, that the motion direction of the movable section at the time when the present detection pulse is outputted is unidentified and sets the change value of the motion amount of the movable section at the time when the present detection pulse is outputted to −1, decides, if the comparison value is n−1 and the motion direction information indicates unidentified inversion, that the motion direction of the movable section at the time when the present detection pulse is outputted is unidentified and sets the change value of the motion amount of the movable section at the time when the present detection pulse is outputted to −1, decides, if the comparison value is 2n−2 and the motion direction information indicates unidentified inversion, that the motion direction of the movable section at the time when the present detection pulse is outputted is unidentified and sets the change value of the motion amount of the movable section at the time when the present detection pulse is outputted to 1, and decides, if the comparison value is n+1 and the motion direction information indicates unidentified inversion, that the motion direction of the movable section at the time when the present detection pulse is outputted is unidentified and sets the change value of the motion amount of the movable section at the time when the present detection pulse is outputted to 1.

Moreover, a fifth motion detecting apparatus of the present invention is, in the above-mentioned fourth motion detecting apparatus of the present invention, characterized in that the operation processing section decides, if the comparison value is n−1 and the motion direction information indicates another direction, that the motion direction of the movable section at the time when the present detection pulse is outputted is one direction and the change value of the motion amount of the movable section at the time when the present detection pulse is outputted is n−1, decides, if the comparison value is n+1 and the motion direction information indicates one direction, that the motion direction of the movable section at the time when the present detection pulse is outputted is another direction and the change value of the motion amount of the movable section at the time when the present detection pulse is outputted is −(n−1), decides, if the comparison value is n−1 and the motion direction information indicates unidentified, that the motion direction of the movable section at the time when the present detection pulse is outputted is another direction and sets the change value of the motion amount of the movable section at the time when the present detection pulse is outputted to −(n−1−(n−1)/2), and decides, if the comparison value is n+1 and the motion direction information indicates unidentified, that the motion direction of the movable section at the time when the present detection pulse is outputted is one direction and sets the change value of the motion amount of the movable section at the time when the present detection pulse is outputted to n−1−(n−1)/2.

Moreover, a sixth motion detecting apparatus of the present invention is, in the above-mentioned fifth motion detecting apparatus of the present invention, characterized in that the operation processing section decides, if the comparison value is 0 and the motion direction information indicates one direction, that the motion direction of the movable section at the time when the present detection pulse is outputted is one direction and the change value of the motion amount of the movable section at the time when the present detection pulse is outputted is 0, decides, if the comparison value is 0 and the motion direction information indicates another direction, that the motion direction of the movable section at the time when the present detection pulse is outputted is another direction and the change value of the motion amount of the movable section at the time when the present detection pulse is outputted is 0, decides, if the comparison value is 0 and the motion direction information indicates unidentified, that the motion direction of the movable section at the time when the present detection pulse is outputted is unidentified and sets the change value of the motion amount of the movable section at the time when the present detection pulse is outputted to 0, and decides, if the comparison value is 0 and the motion direction information indicates unidentified inversion, that the motion direction of the movable section at the time when the present detection pulse is outputted is unidentified inversion and sets the change value of the motion amount of the movable section at the time when the present detection pulse is outputted to 0.

Moreover, a seventh motion detecting apparatus of the present invention is, in the above-mentioned sixth motion detecting apparatus of the present invention, characterized in that each of the magnetic field detecting sections is provided with a magnetic element producing large Barkhausen effect and a coil wound around the magnetic element.

Effects of the Invention

In accordance with the present invention, it is possible to complement missing of a detection pulse of a magnetic field detecting section without using a detection pulse outputted two times before and to reduce information used for processes of complementing missing of a detection pulse of a magnetic field detecting section.

BRIEF DESCRIPTION OF THE DRAWINGS

FIG. 7 It is an explanatory drawing illustrating correspondence relationship between motions of a movable section and information used for the rotation detecting process in the rotation detecting apparatus in accordance with the embodiment of the present invention.

FIG. 8 It is an explanatory drawing illustrating correspondence relationship between motions of the movable section and information used for the rotation detecting process in the rotation detecting apparatus in accordance with the embodiment of the present invention.

FIG. 9 It is an explanatory drawing illustrating correspondence relationship between motions of the movable section and information used for the rotation detecting process in the rotation detecting apparatus in accordance with the embodiment of the present invention.

EMBODIMENTS FOR CARRYING OUT THE INVENTION

In the following, embodiments of the present invention will be described with reference to the drawings.

(Structure of Rotation Detecting Apparatus)

Figure 1:
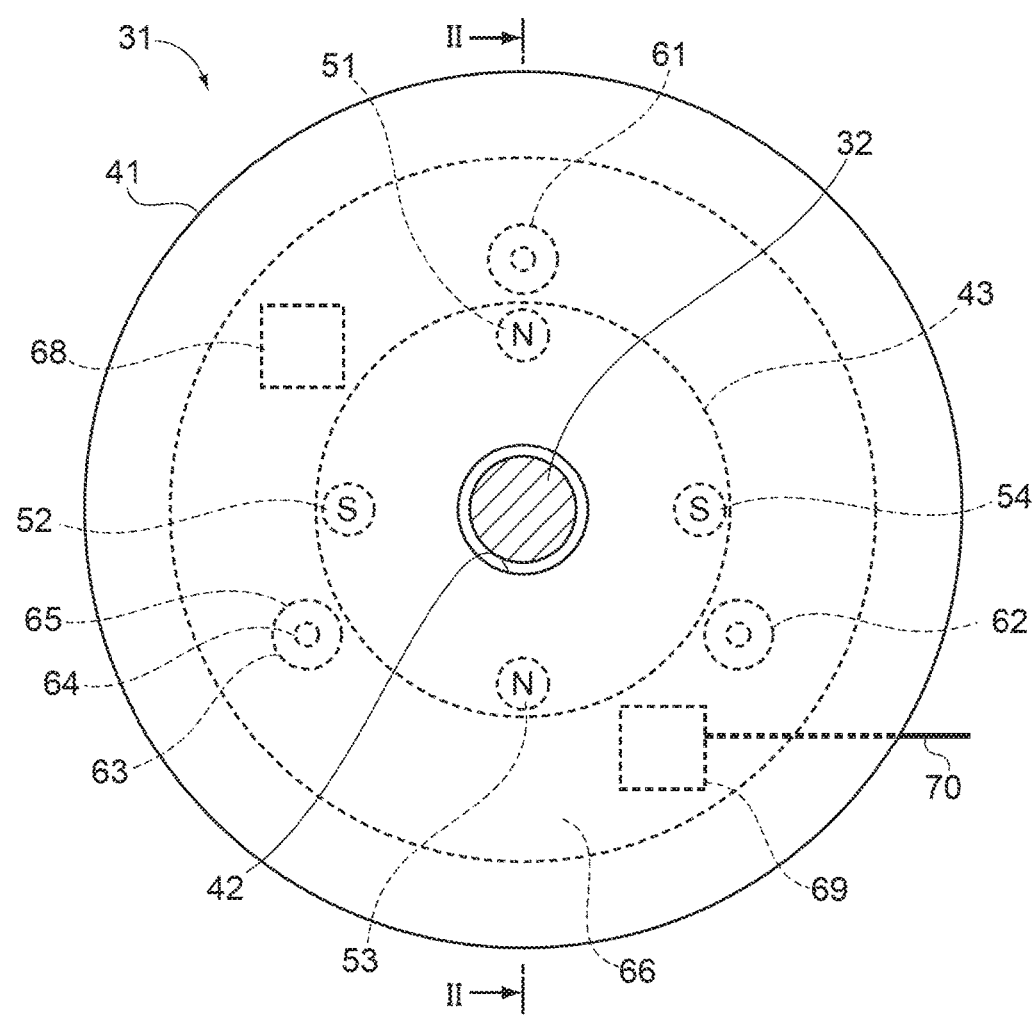
FIG. 1 It is an explanatory drawing showing a rotation detecting apparatus in accordance with an embodiment of the present invention.
Figure 2:
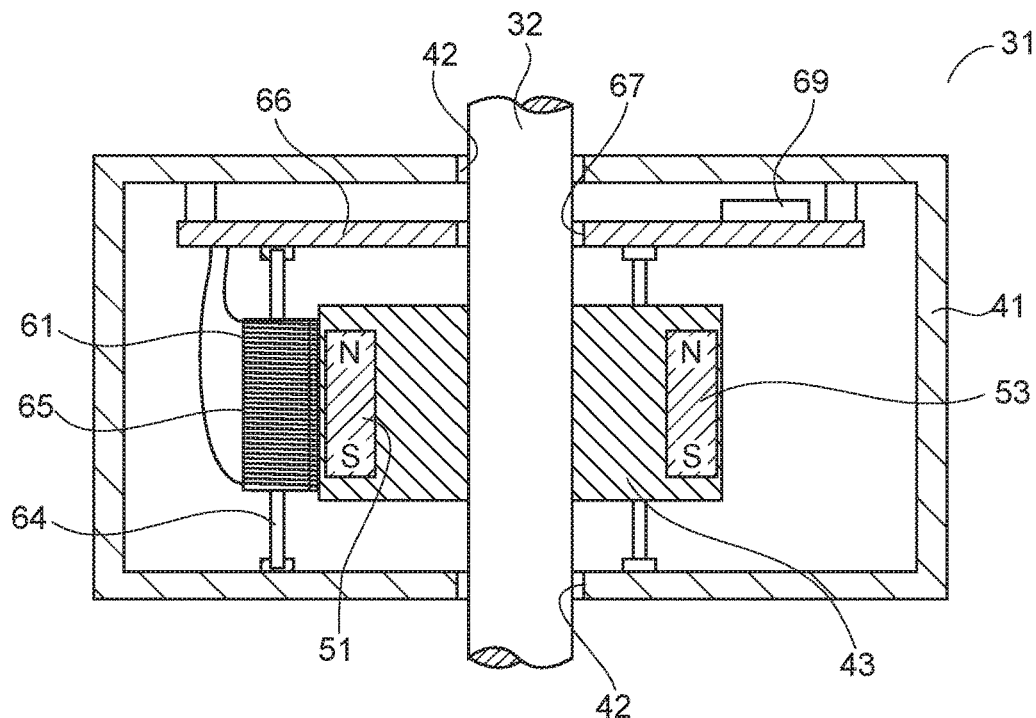
FIG. 2 It is a sectional view showing the rotation detecting apparatus as viewed from a direction indicated by arrows II-II in FIG. 1.

FIG. 1 shows a rotation detecting apparatus in accordance with an embodiment of the present invention, and FIG. 2 shows a section of the rotation detecting apparatus as viewed from a direction indicated arrows II-II in FIG. 1.

In FIG. 1, the rotation detecting apparatus 31 of an embodiment of a motion detecting apparatus for the present invention is an apparatus for detecting rotating motion, concretely a rotation direction and a rotation amount, of a detected object. The rotation detecting apparatus 31 can be applied to detecting the rotating motion of various detected objects. In the embodiment, the detected object is, for example, a rotation shaft 32 of a servomotor provided in a movable portion of an industrial robot.

The rotation detecting apparatus 31 is provided with a casing 41 formed of, for example, resin or the like and formed in a cylindrical shape with a lid. In the casing 41, insertion holes 42 into which the rotation shaft 32 is rotatably inserted are formed. The casing 41 is, for instance, attached and fixed to the industrial robot via a not-shown attachment member.

Inside the casing 41, a movable section 43 is provided. The movable section 43 is formed in a columnar shape, for example, and fixed to the rotation shaft 32 in such a way that its center coincides with an axial center of the rotation shaft 32. Since the movable section 43 is rotated together with the rotation shaft 32, a rotation direction and a rotation amount of the movable section 43 coincides with a rotation direction and a rotation amount of the rotation shaft 32.

At an outer circumference part of the movable section 43, four (two pairs of) magnets 51, 52, 53 and 54 are provided. The magnets 51, 52, 53 and 54 are located in this order in a leftward direction in a circumference direction of the movable section 43 and located at intervals of 90 degrees around the rotation shaft 32. Each of the magnets 51 and 53 are fixed inside the movable section 43 in such a way that, in FIG. 1, an N-pole is on the front side and S-pole is on the back side. Moreover, each of the magnets 52 and 54 are fixed inside the movable section 43 in such a way that, in FIG. 1, an S-pole is on the front side and an N-pole is on the back side.

According to this, at an outer circumference side of the movable section 43, magnetic fields whose directions change for every 90 degrees are generated. Incidentally, the magnets 51, 52, 53 and 54 are concrete examples of magnetic field generating sections.

Moreover, at an area in the periphery of the movable section 43 and in the vicinity of the outer circumference part of the movable section 43 inside the casing 41, three magnetic sensors 61, 62 and 63 are provided. Each of the magnetic sensors 61, 62 and 63 includes a composite magnetic wire 64, which is a magnetic element producing large Barkhausen effect, and a coil 65 wound around the composite magnetic wire 64. The magnetic sensors 61, 62 and 63 are concrete examples of magnetic field detecting sections.

The composite magnetic wire 64 is a fine wire-like ferromagnetic substance and has uniaxial anisotropy. Namely, in the composite magnetic wire 64, coercive force of an axial center part is larger than coercive force of an outer circumference part, and thereby, a magnetization direction of the axial center part is not changed unless relatively large external magnetic field is applied, but a magnetization direction of the outer circumference part is changed by applying relatively small external magnetic field. By applying relatively small external magnetic field to the composite magnetic wire 64, it is possible to change only the magnetization direction of the outer circumference part and then to retain that magnetization state. Moreover, in the composite magnetic wire 64, when the magnetization direction of the outer circumference part is changed so as to become the same as the magnetization direction of the axial center part, the magnetization direction is suddenly inverted by large Barkhausen effect. In addition, in the composite magnetic wire 64, when the magnetization direction of the outer circumference part is changed so as to become an opposite direction to the magnetization direction of the axial center part, the magnetization direction is also suddenly inverted. By electromotive force generated when the magnetization direction is suddenly inverted, a pulse signal whose level stands up in a positive direction or a negative direction in accordance with the inverted magnetization direction is outputted from the coil 65.

Each of the magnetic sensors 61, 62 and 63 is, as shown in FIG. 2, fixed inside the casing 41 by supporting one end part of the composite magnetic wire 64 to a substrate 66 and supporting another end part to a wall part of the casing 41. In addition, each of the magnetic sensors 61, 62 and 63 is arranged such that a longitudinal direction of the composite magnetic wire 64 becomes parallel to a direction of a magnetic field generated from each of the magnets 51, 52, 53 and 54. Moreover, the magnetic sensors 61, 62 and 63 are, as shown in FIG. 1, located in this order in a leftward direction so as to be along a circular external shape of the movable section 43 and located at intervals of 120 degrees around the rotation shaft 32.

When the movable section 43 is rotated according to rotation of the rotation shaft 32, the magnets 51, 52, 53 and 54 approach the magnetic sensors 61, 62 and 63 at respective different timings, and thereby, detection pulses each of which is in the positive direction or the negative direction is outputted from the respective magnetic sensors 61, 62 and 63 at respective different timings. Namely, when the magnet 51 with the N-pole on the front side approaches the magnetic sensor 61 and the magnetization direction of the magnetic sensor 61 is inverted by the magnetic field generated by the magnet 51, the detection pulse in the positive direction is outputted from the magnetic sensor 61. The same goes for the time when the magnet 53 approaches the magnetic sensor 61. Moreover, when the magnet 52 with the S-pole on the front side approaches the magnetic sensor 61 and the magnetization direction of the magnetic sensor 61 is inverted by the magnetic field generated by the magnet 51, the detection pulse in the negative direction is outputted from the magnetic sensor 61. The same goes for the time when the magnet 54 approaches the magnetic sensor 61. However, when the magnets with the same poles approach the magnetic sensor 61 twice or more times continuously, the magnetization direction of the magnetic sensor 61 is not inverted at the second or more time of approach. When the magnetization direction of the magnetic sensor 61 is not inverted by addition of the magnetic field in the same direction, neither a positive directional detection pulse nor a negative directional detection pulse is outputted from the magnetic sensor 61. The same goes for the magnetic sensors 62 and 63. Incidentally, there is detail description about a case where the magnetization direction of the magnetic sensor is not inverted by addition of the magnetic field in the same direction in a column of the background art of the present specification.

Moreover, inside the casing 41, the substrate 66 is provided. The substrate 66 is, for instance, fixed to the wall part of the casing 41. In addition, the substrate 66 is, as shown in FIG. 1, formed in a disc shape and, as shown in FIG. 2, a hole part 67 into which the rotation shaft 32 is rotatably penetrated is formed in its center part. On the substrate 66, a rotation detecting circuit 68 and a connector are provided. Moreover, the coil 65 of each of the magnetic sensors 61, 62 and 63 is electrically connected to the rotation detecting circuit 68 on the substrate 66. Moreover, a rotation amount detection value stored in a storage section 82 in the rotation detecting circuit 68 can be outputted outside by connecting a cable 70 to the connector 69.

(Rotation Detecting Circuit)

Figure 3:
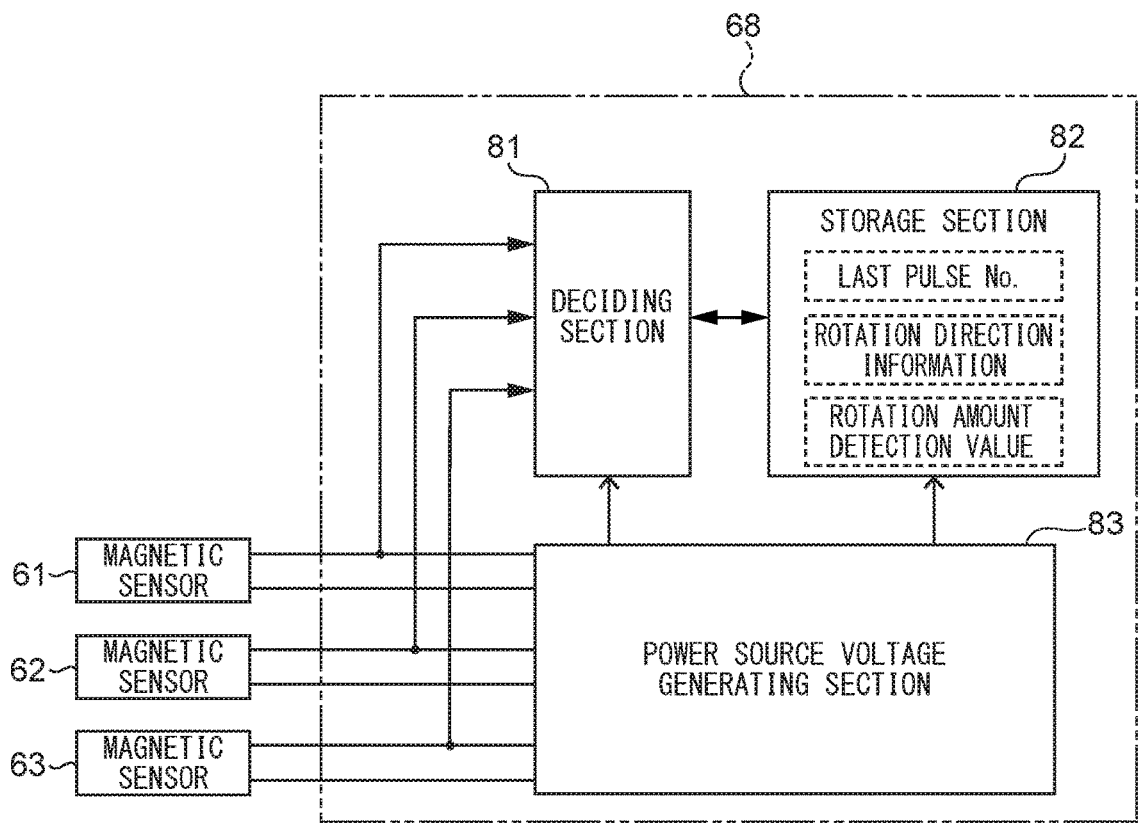
FIG. 3 It is a circuit diagram showing a rotation detecting circuit of the rotation detecting apparatus in accordance with the embodiment of the present invention.

FIG. 3 shows inside structure of the rotation detecting circuit 68. The rotation detecting circuit 68 is a circuit for detecting the rotation direction and the rotation amount of the movable section 43. The rotation detecting circuit 68 includes a deciding section 81, the storage section 82 and a power source voltage generating circuit 83. Incidentally, the rotation detecting circuit 68 is a concrete example of a motion detecting circuit.

The deciding section 81 decides the rotation direction and the rotation amount of the movable section 43 on the basis of a last pulse number, rotation direction information and rotation amount detection value mentioned below, and updates the last pulse number, the rotation direction information and the rotation amount detection value stored in the storage section 82 on the basis of these decided results. Incidentally, the deciding section 81 is a concrete example of an operation processing section and an update processing section.

The storage section 82 is composed of a storage element with non-volatility to store the last pulse number, the rotation direction information and the rotation amount detection value, which are information required for decision processing of the deciding section 81.

The power source voltage generating circuit 83 includes a rectifier circuit, a constant voltage circuit and others to generate direct current power source voltage on the basis of the detection pulses outputted from the magnetic sensors 61, 62 and 63, and to supply the power source voltage to the deciding section 81 and the storage section 82. The deciding section 81 and the storage section 82 are operated by the power source voltage supplied from the power source voltage generating circuit 83. Thereby, it is possible to actualize the rotation detecting apparatus 31 without power supply.

(Basic Flow of Rotation Detecting Process)

Figure 4:
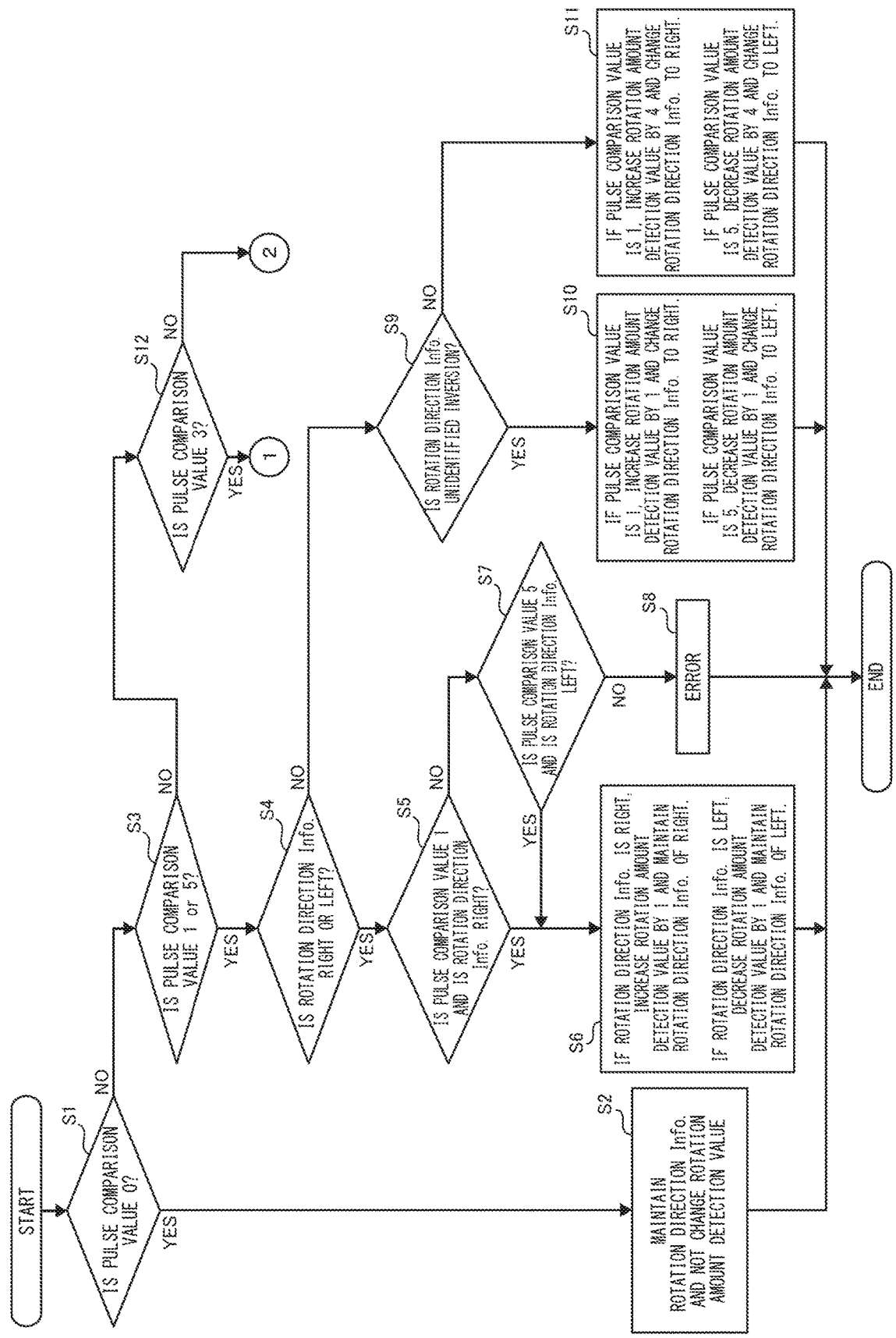
FIG. 4 It is a flow chart illustrating a rotation detecting process in the rotation detecting apparatus in accordance with the embodiment of the present invention.
Figure 5:
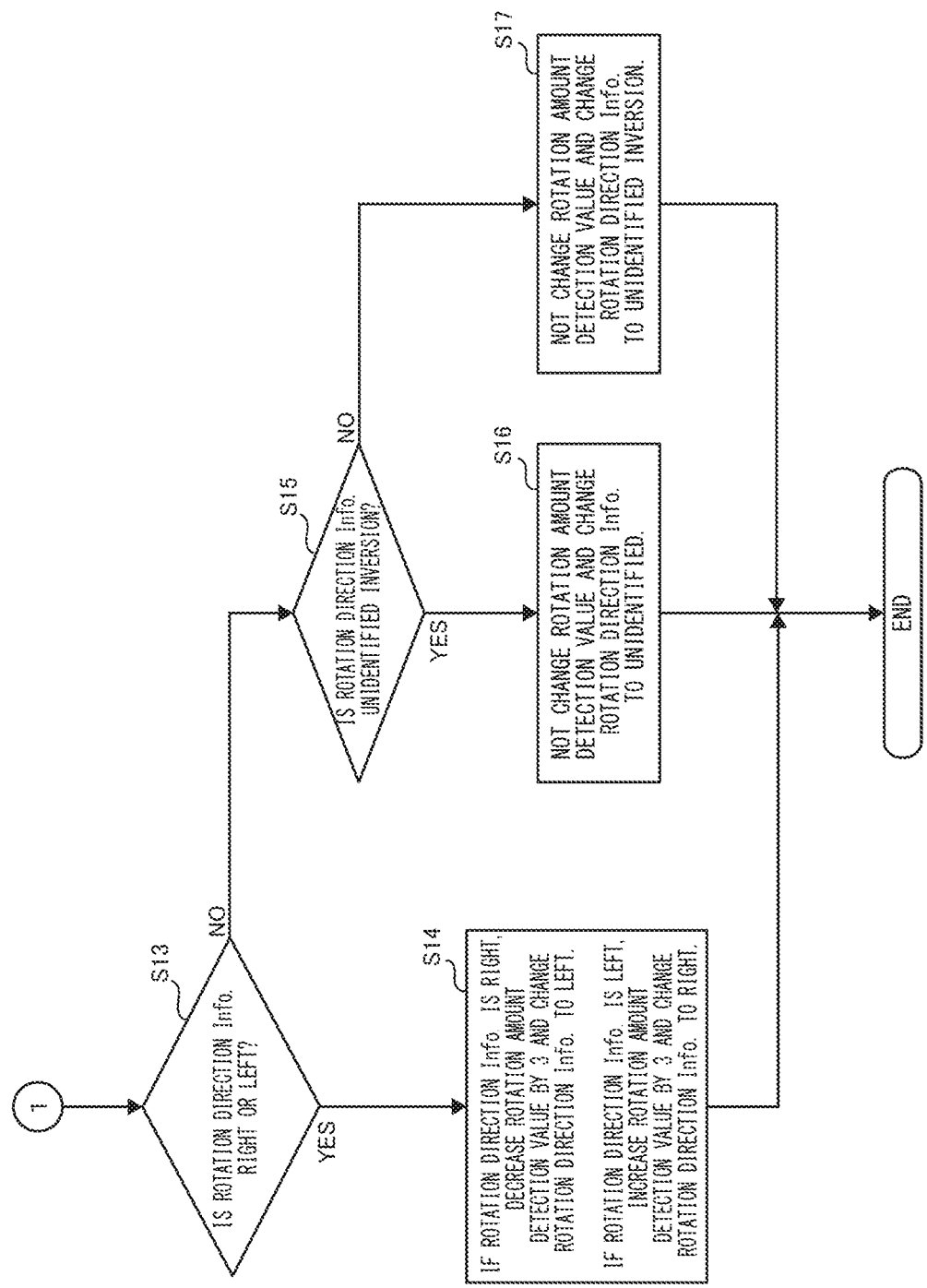
FIG. 5 It is a flow chart continued from FIG. 4.
Figure 6:
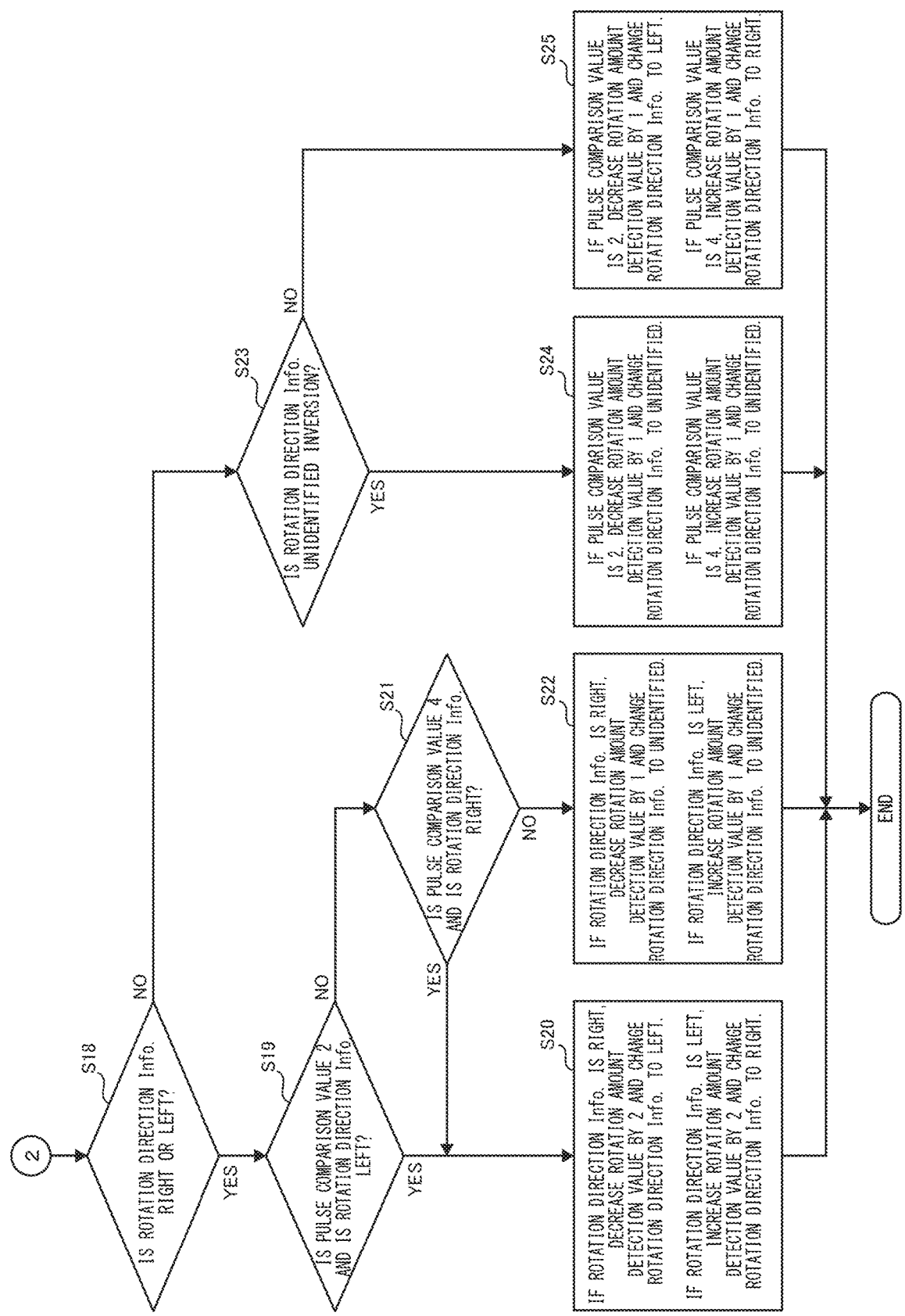
FIG. 6 It is a flow chart continued from FIG. 4.

FIGS. 4 to 6 illustrate a rotation detecting process by the rotation detecting circuit 68. FIGS. 7 to 9 illustrate correspondence relationship between motions of the movable section 43 and information used for the rotation detecting process.

Upon executing the rotation detecting process, the deciding section 81 assigns respective numbers to the positive directional detection pulses and the negative directional detection pulses outputted from the magnetic sensors 61, 62 and 63. Namely, as mentioned above, the magnets 51, 52, 53 and 54 are located in this order at intervals of 90 degrees in a leftward direction in such a way that the poles on the front sides become the N-pole, the S-pole, the N-pole and the S-pole, and the magnetic sensors 61, 62 and 63 are located in this order at intervals of 120 degrees in a rightward direction. Under such an arrangement of the magnets 51, 52, 53 and 54 and the magnetic sensors 61, 62 and 63, when the movable section 43 is rotated in the rightward direction, in the meantime, detection pulses in either one of the positive direction and the negative direction are continuously outputted one by one at different timings from the respective three magnetic sensors 61, 62 and 63 (the positive or negative directions of the respective three detection pulses outputted in this meantime are not always the same as each other). Subsequently, if the movable section 43 is further rotated in the rightward direction, in the meantime, detection pulses in respective another directions of the positive direction and the negative direction are continuously outputted one by one at different timings from the respective three magnetic sensors 61, 62 and 63 (the positive or negative directions of the respective three detection pulses outputted in this meantime are not always the same as each other). As a result, a constant output pattern composed of a total of six detection pulses being different in combination of an output source and the positive or negative direction is formed. The deciding section 81 assigns the numbers of "1", "2", "3", "4", "5", "6" to the six detection pulses forming this output pattern.

Concretely, if the movable section 43 is rotated in the rightward direction, the magnet 51 approaches the magnetic sensor 61, the magnetization direction of the magnetic sensor 61 is inverted, and the positive directional detection pulse is outputted from the magnetic sensor 61, and then, the magnet approaches the magnetic sensor 62, the magnetization direction of the magnetic sensor 62 is inverted, and the negative directional detection pulse is outputted from the magnetic sensor 62, and then, the magnet 53 approaches the magnetic sensor 63, the magnetization direction of the magnetic sensor 63 is inverted, and the positive directional detection pulse is outputted from the magnetic sensor 63. Subsequently, if the movable section 43 is further rotated in the rightward direction, the magnet 52 approaches the magnetic sensor 61, the magnetization direction of the magnetic sensor 61 is inverted, and the negative directional detection pulse is outputted from the magnetic sensor 61, and then, the magnet 51 approaches the magnetic sensor 62, the magnetization direction of the magnetic sensor 62 is inverted, and the positive directional detection pulse is outputted from the magnetic sensor 62, and then, the magnet 54 approaches the magnetic sensor 63, the magnetization direction of the magnetic sensor 63 is inverted, and the negative directional detection pulse is outputted from the magnetic sensor 63. As a result, the output pattern composed of the positive directional detection pulse from the output source being the magnetic sensor 61, the negative directional detection pulse from the output source being the magnetic sensor 62, the positive directional detection pulse from the output source being the magnetic sensor 63, the negative directional detection pulse from the output source being the magnetic sensor 61, the positive directional detection pulse from the output source being the magnetic sensor 62 and the negative directional detection pulse from the output source being the magnetic sensor 63 is formed. Furthermore, the deciding section 81 assigns "1" to the positive directional detection pulse from the output source being the magnetic sensor 61, "2" to the negative directional detection pulse from the output source being the magnetic sensor 62, "3" to the positive directional detection pulse from the output source being the magnetic sensor 63, "4" to the negative directional detection pulse from the output source being the magnetic sensor 61, "5" to the positive directional detection pulse from the output source being the magnetic sensor 62, and "6" to the negative directional detection pulse from the output source being the magnetic sensor 63.

The deciding section 81 identifies input terminals of the rotation detecting circuit 68 respectively connected to the magnetic sensors 61, 62 and 63, and detects levels of the detection pulses respectively outputted from the magnetic sensors 61, 62 and 63, and thereby, respectively distinguishes the six detection pulses being different in combination of the output source and the positive or negative direction, and assigns the numbers to these detection pulses as mentioned above.

Incidentally, although the rotation detecting apparatus having the three magnetic sensors is explained as the embodiment of the present invention, the present invention can be applied to a rotation detecting apparatus having n magnetic sensors (n is an integer 3 or more). If the present invention is applied to the rotation detecting apparatus having n magnetic sensors, the number of the detection pulses being different in combination of the output source and the positive or negative direction becomes 2n with respect to the output pattern of the detection pulses, and therefore, the numbers of 1, 2, 3, . . . , n, n+1, n+2, n+3, . . . , 2n are assigned to these detection pulses.

Subsequently, the deciding section 81 executes an initial setting process of rotation detecting at the start of the rotation detecting apparatus 31. In the initial setting process, the deciding section 81 firstly stores an initial value (e.g., 0, or an input value from the outside indicating the rotation amount of the rotation shaft 32 immediately before the start of the rotation detecting apparatus 31 or the like) of the rotation amount detection value mentioned below in the storage section 82. Subsequently, the deciding section 81 stores the number of the detection pulse which is outputted from any one of the magnetic sensors 61, 62 and 63 at first time due to starting of rotation of the movable section 43, as the last pulse number mentioned below in the storage section 82. Subsequently, the deciding section 81 subtracts the last pulse number (the number of the detection pulse outputted at first time) stored in the storage section 82 from the number of the detection pulse outputted from any one of the magnetic sensors 61, 62 and 63 at second time and decides whether a value obtained thereby is positive or negative. Then, if this obtained value is positive, the deciding section 81 decides that the movable section 43 is rotated in the rightward direction, and stores "rightward direction" as the rotation direction information mentioned below in the storage section 82. If the above-mentioned obtained value is negative, the deciding section 81 decides that the movable section 43 is rotated in the leftward direction, and stores "leftward direction" as the rotation direction information in the storage section 82. Subsequently, the deciding section 81 stores the above-mentioned number of the detection pulse outputted at second time as the last detection pulse in the storage section 82, thereby updating the last detection pulse. Further, the deciding section 81 increases the rotation amount detection value by 1 when the movable section 43 is rotated in the rightward direction or decreases the rotation amount detection value by 1 when the movable section 43 is rotated in the leftward direction, thereby updating the rotation amount detection value.

Subsequently, the deciding section 81 starts execution of the rotation detecting process shown in FIGS. 4 to 6. A basic flow of the rotation detecting process is as follows. The rotation detecting process is executed when the detection pulse is outputted from any one of the magnetic sensors 61, 62 and 63 after the above-mentioned initial setting is completed. Hereinafter, the newest detection pulse outputted from any one of the magnetic sensors 61, 62 and 63 at the present time is called as a "present detection pulse", and the number assigned to the present detection pulse is called as a "present pulse number". In addition, on the basis of the time when the present detection pulse is outputted, the detection pulse outputted from any one of the magnetic sensors 61, 62 and 63 last time is called as a "last detection pulse", and the number assigned to the last detection pulse is called as a "last pulse number". At the time when the present detection pulse is outputted, the last pulse number, the rotation direction information indicating the rotation direction of the movable section 43 at the time when the last detection pulse is outputted, and the rotation amount detection value indicating the rotation amount of the movable section 43 at the time when the last detection pulse is outputted have been stored in the storage section 82.

Here, the last pulse number is the number assigned to each of the six detection pulses being different in combination of the output source and the positive or negative direction. Therefore, a data size required for storing the last pulse number in the storage section 82 is 3 bits.

Moreover, in the rotation direction information, there are four kinds of values of "rightward direction", "leftward direction", "unidentified" and "unidentified inversion". The "rightward direction" indicates that the movable section 43 is rotated in the rightward direction, and the "leftward direction" indicates that the movable section 43 is rotated in the leftward direction. Moreover, the "unidentified" indicates the state (hereinafter, this is called as "unidentified state") of being unable to identify whether the movable section 43 is rotated in the rightward direction or the leftward direction. Moreover, the "unidentified inversion" indicates the state (hereinafter, this is called as "unidentified inversion state") that the movable section 43 changes the rotation direction (is inverted) when the movable section 43 is the unidentified state. Since the rotation direction information thus has four kinds of values, a data size required for storing the rotation direction information in the storage section 82 is 2 bits.

Moreover, the rotation amount detection value is a value indicating the rotation amount of the movable section 43. In the rotation detecting apparatus 31 according to the present embodiment, it is possible to detect the change of the rotation amount of the movable section 43 in a unit of 30 degrees basically. In the rotation detecting process, the rotation amount detection value is increased by 1 when the movable section 43 is rotated by 30 degrees in the rightward direction, and the rotation amount detection value is decreased by 1 when the movable section 43 is rotated by 30 degrees in the leftward direction. The rotation detecting apparatus 31 can detect a case where the movable section 43 is rotated over one rotation, i.e., multiple-rotation of the movable section 43. A data size required for storing the rotation amount detection value in the storage section 82 is determined according to how much the maximum of the detectable rotation amount of the movable section 43 in the rotation detecting apparatus 31 is set.

In the rotation detecting process, when the detection pulse is outputted from any one of the magnetic sensors 61, 62 and 63, the deciding section 81 detects the output source and the positive or negative direction of the detection pulse, and decides the present pulse number.

Subsequently, the deciding section 81 subtracts the last pulse number stored in the storage section 82 from this present pulse number, and thereby obtains a pulse comparison value. The "pulse comparison value" means a value obtained by subtracting the last pulse number from the present pulse number. Incidentally, if the value obtained by subtracting the last pulse number from the present pulse number becomes negative, a value obtained by adding 6 (2n) to this value is used as the pulse comparison value.

Subsequently, the deciding section 81 decides the rotation direction of the movable section 43 at the time when the present detection pulse is outputted, on the basis of the pulse comparison value and the rotation direction information stored in the storage section 82, and decides which of the "rightward direction", "leftward direction", "unidentified" and "unidentified inversion" it corresponds with.

Subsequently, the deciding section 81 decides or sets a change amount of the rotation amount of the movable section until the time when the present detection pulse is outputted after the time when the last detection pulse is outputted, on the basis of the pulse comparison value and the rotation direction information stored in the storage section 82. Hereinafter, the change amount of the rotation amount of the movable section 43 until the time when the present detection pulse is outputted after the time when the last detection pulse is outputted is called as "rotation change amount".

Here, decision standard information defining correspondence relationship among the pulse comparison values, the last rotation direction information, the present rotation direction information, and the present rotation change amounts is previously stored in the storage section 82. The deciding section 81 decides the rotation direction information and the rotation change amount at the time when present detection pulse is outputted, on the basis of the rotation direction information stored in the storage section 82 and the pulse comparison value by using the decision standard information. The decision standard information includes, for example, as shown in FIGS. 7 to 9, the pulse comparison values in a case of three sensors, the last rotation direction information, the present rotation direction information, and the rotation change amount information in a case of three sensors. Generally, the decision standard information is a part of computer program for executing the rotation detecting process. For instance, each value in the decision standard information is defined as a constant in this computer program.

Subsequently, the deciding section 81 rewrites the last pulse number stored in the storage section 82 by the present pulse number, thereby updating the last pulse number stored in the storage section 82. Moreover, the deciding section 81 rewrites the rotation direction information stored in the storage section 82 by information indicating decided result of the rotation direction at the time when the present detection pulse is outputted, thereby updating the rotation direction information stored in the storage section 82.

The basic flow of the rotation detecting process is as above. Next, a detail flow of the rotation detecting process will be described by using concrete examples and FIGS. 4 to 9.

Firstly, four normal processes A to D will be described. The normal processes are processes of deciding the rotation direction and the rotation amount of the movable section 43 in a case where the missing of the detection pulse does not occur.

(Normal Process A)

For instance, last time, the movable section 43 is rotated in the rightward direction, the magnet 52 approaches the magnetic sensor 63, the magnetization direction of the magnetic sensor 63 is inverted, and the negative directional detection pulse is outputted from the magnetic sensor 63. The missing of the detection pulse had not occurred until that time. As a result, in the storage section 82, the last pulse number is updated to "6", and the rotation direction is updated to the "rightward direction". From this state, the movable section 43 is rotated by approximately 30 degrees in the rightward direction, the magnet 51 approaches the magnetic sensor 61, the magnetization direction of the magnetic sensor 61 is inverted, and the positive directional detection pulse is outputted from the magnetic sensor 61.

The rotation detecting process in this case is as follows. Namely, since the output source of the present detection pulse is the magnetic sensor 61 and the direction of the pulse is positive, the deciding section 81 decides that the present pulse number is "1". Subsequently, since the present pulse number is "1" and the last pulse number is "6", the deciding section 81 subtracts the last pulse number from the present pulse number and decides that the pulse comparison value is 1 (although −5 is obtained by subtracting "6" from "1", a value obtained by adding 6 to this value is used as the pulse comparison value in a case where a result of subtraction is a negative value). Subsequently, in a case where the pulse comparison value is 1 and the rotation direction information is the "rightward direction" (step S1: NO, step S3: YES, step S4: YES, step S5: YES in FIG. 4), the deciding section 81 decides that the rotation direction of the movable section 43 at the time when the present detection pulse is outputted is the "rightward direction" and the rotation change amount is 1 (step S6 in FIG. 4, a process number P1 in FIG. 7). Subsequently, the deciding section 81 updates the last pulse number to "1", increases the rotation amount detection value by 1, and maintains the rotation direction information of the "rightward direction" as it is.

(Normal Process B)

For instance, last time, the movable section 43 is rotated in the leftward direction, the magnet 54 approaches the magnetic sensor 62, the magnetization direction of the magnetic sensor 62 is inverted, and the negative directional detection pulse is outputted from the magnetic sensor 62. The missing of the detection pulse had not occurred until that time. As a result, in the storage section 82, the last pulse number is updated to "2", and the rotation direction is updated to the "leftward direction". From this state, the movable section 43 is rotated by approximately 30 degrees in the leftward direction, the magnet 51 approaches the magnetic sensor 61, the magnetization direction of the magnetic sensor 61 is inverted, and the positive directional detection pulse is outputted from the magnetic sensor 61.

The rotation detecting process in this case is as follows. Namely, since the output source of the present detection pulse is the magnetic sensor 61 and the direction of the pulse is positive, the deciding section 81 decides that the present pulse number is "1". Subsequently, since the present pulse number is "1" and the last pulse number is "2", the deciding section 81 subtracts the last pulse number from the present pulse number and decides that the pulse comparison value is 5 (although −1 is obtained by subtracting "2" from "1", a value obtained by adding 6 to this value is used as the pulse comparison value in the case where the result of subtraction is the negative value). Subsequently, in a case where the pulse comparison value is 5 and the rotation direction information is the "leftward direction" (step S1: NO, step S3: YES, step S4: YES, step S5: NO, step S7: YES, in FIG. 4), the deciding section 81 decides that the rotation direction of the movable section 43 at the time when the present detection pulse is outputted is the "leftward direction" and the rotation change amount is −1 (step S6 in FIG. 4, a process number P2 in FIG. 7). Subsequently, the deciding section 81 updates the last pulse number to "5", decreases the rotation amount detection value by 1, and maintains the rotation direction information by the "leftward direction" as it is.

(Normal Process C)

For instance, last time, the movable section 43 is rotated in the rightward direction, the magnet 51 approaches the magnetic sensor 61, the magnetization direction of the magnetic sensor 61 is inverted, and the positive directional detection pulse is outputted from the magnetic sensor 61. The missing of the detection pulse had not occurred until that time. As a result, in the storage section 82, the last pulse number is updated to "1", and the rotation direction is updated to the "rightward direction". From this state, the movable section 43 changes the rotation direction from the rightward direction to the leftward direction and is rotated by approximately 120 degrees in the leftward direction. While the movable section 43 is rotated by approximately 120 degrees in the leftward direction, firstly, the magnets 51, 52 and 53 respectively approach the magnetic sensors 61, 63 and 62 in order, however, the magnetization directions of the magnetic sensors 61, 63 and 62 are not inverted by addition of the magnetic fields in the same directions. Subsequently, when the magnet 54 approaches the magnetic sensor 61, the magnetization direction of the magnetic sensor 61 is inverted, and the negative directional detection pulse is outputted from the magnetic sensor 61.

The rotation detecting process in this case is as follows. Namely, since the output source of the present detection pulse is the magnetic sensor 61 and the direction of the pulse is negative, the deciding section 81 decides that the present pulse number is "4". Subsequently, since the present pulse number is "4" and the last pulse number is "1", the deciding section 81 subtracts the last pulse number from the present pulse number and decides that the pulse comparison value is 3. Subsequently, in a case where the pulse comparison value is 3 and the rotation direction information is the "rightward direction" (step S1: NO, step S3: NO, step S12: YES in FIG. 4, step S13: YES in FIG. 5), the deciding section 81 decides that the rotation direction of the movable section 43 at the time when the present detection pulse is outputted is the "leftward direction", and the rotation change amount is −3 (step S14 in FIG. 5, a process number P3 in FIG. 7). Subsequently, the deciding section 81 updates the last pulse number to "4", decreases the rotation amount detection value by 3, and updates the rotation direction information to the "leftward direction".

Incidentally, although the rotation detecting apparatus having the three magnetic sensors is explained as the embodiment of the present invention, the present invention can be applied to a rotation detecting apparatus having n magnetic sensors (n is an integer 3 or more). If the present invention is applied to the rotation detecting apparatus having n magnetic sensors, when the movable section changes the rotation direction from the rightward direction to the leftward direction and continues rotation in the leftward direction, the number of magnet sensors whose magnetization directions are not inverted by addition of the magnetic fields in the same directions becomes n, and consequently, the pulse comparison value becomes n and the rotation change amount becomes −n.

(Normal Process D)

For instance, last time, the movable section 43 is rotated in the leftward direction, the magnet 51 approaches the magnetic sensor 61, the magnetization direction of the magnetic sensor 61 is inverted, and the positive directional detection pulse is outputted from the magnetic sensor 61. The missing of the detection pulse had not occurred until that time. As a result, in the storage section 82, the last pulse number is updated to "1", and the rotation direction is updated to the "leftward direction". From this state, the movable section 43 changes the rotation direction from the leftward direction to the rightward direction and is rotated by approximately 120 degrees in the rightward direction. While the movable section 43 is rotated by approximately 120 degrees in the rightward direction, firstly, the magnets 51, 54 and 53 respectively approach the magnetic sensors 61, 62 and 63 in order, however, the magnetization directions of the magnetic sensors 61, 62 and 63 are not inverted by addition of the magnetic fields in the same directions. Subsequently, when the magnet 52 approaches the magnetic sensor 61, the magnetization direction of the magnetic sensor 61 is inverted, and the negative directional detection pulse is outputted from the magnetic sensor 61.

The rotation detecting process in this case is as follows. Namely, since the output source of the present detection pulse is the magnetic sensor 61 and the direction of the pulse is negative, the deciding section 81 decides that the present pulse number is "4". Subsequently, since the present pulse number is "4" and the last pulse number is "1", the deciding section 81 subtracts the last pulse number from the present pulse number and decides that the pulse comparison value is 3. Subsequently, in a case where the pulse comparison value is 3 and the rotation direction information is the "leftward direction" (step S1: NO, step S3: NO, step S12: YES in FIG. 4, step S13: YES in FIG. 5), the deciding section 81 decides that the rotation direction of the movable section 43 at the time when the present detection pulse is outputted is the "rightward direction", and the rotation change amount is 3 (step S14 in FIG. 5, a process number P4 in FIG. 7). Subsequently, the deciding section 81 updates the last pulse number to "4", increases the rotation amount detection value by 3, and updates the rotation direction information to the "rightward direction".

Incidentally, if the present invention is applied to the rotation detecting apparatus having n magnetic sensors (n is an integer 3 or more), when the movable section changes the rotation direction from the leftward direction to the rightward direction and continues rotation in the rightward direction, the number of the magnet sensors whose magnetization directions are not inverted by addition of the magnetic fields in the same directions becomes n, and consequently, the pulse comparison value becomes n and the rotation change amount becomes n.

Next, twelve missing complementing processes A to L will be described. The missing complementing processes are processes of deciding the rotation direction and the rotation amount of the movable section 43 in a case where the missing of the detection pulse occurs.

(Missing Complementing Process A)

For instance, last time, the movable section 43 is rotated in the rightward direction, the magnet 51 approaches the magnetic sensor 61, the magnetization direction of the magnetic sensor 61 is inverted, and the positive directional detection pulse is outputted from the magnetic sensor 61.

The missing of the detection pulse had not occurred until that time. As a result, in the storage section 82, the last pulse number is updated to "1", and the rotation direction is updated to the "rightward direction". From this state, the movable section 43 is rotated by approximately 60 degrees in the rightward direction. While the movable section 43 is rotated by approximately 60 degrees in the rightward direction, firstly, the magnet 54 approaches the magnetic sensor 62, and the magnetization direction of the magnetic sensor 62 is inverted. However, the detection pulse to be outputted from the magnetic sensor 62 is missed. Subsequently, the magnet 53 approaches the magnetic sensor 63, the magnetization direction of the magnetic sensor 63 is inverted, and the positive directional detection pulse is outputted from the magnetic sensor 63.

The rotation detecting process in this case is as follows. Namely, since the output source of the present detection pulse is the magnetic sensor 63 and the direction of the pulse is positive, the deciding section 81 decides that the present pulse number is "3". Subsequently, since the present pulse number is "3" and the last pulse number is "1", the deciding section 81 subtracts the last pulse number from the present pulse number and decides that the pulse comparison value is 2. Subsequently, in a case where the pulse comparison value is 2 and the rotation direction information is the "rightward direction" (step S1: NO, step S3: NO, step S12: NO in FIG. 4, step S18: YES, step S19: NO, step S21: NO in FIG. 6), the deciding section 81 decides that the rotation direction of the movable section 43 at the time when the present detection pulse is outputted is the "unidentified" and sets −1 as a first adjustment value to the rotation change amount (step S22 in FIG. 6, a process number P5 in FIG. 8). Subsequently, the deciding section 81 updates the last pulse number to "3", decreases the rotation amount detection value by 1 and updates the rotation direction information to the "unidentified".

Incidentally, in this process, −1 set to the rotation change amount is the first adjustment value for effectively and appropriately executing the rotation detecting process according to the present embodiment. If the present invention is applied to the rotation detecting apparatus having n magnetic sensors, the first adjustment value is −(n−1)/2.

(Missing Complementing Process B)

For instance, last time, the movable section 43 is rotated in the leftward direction, the magnet 53 approaches the magnetic sensor 62, the magnetization direction of the magnetic sensor 62 is inverted, and the positive directional detection pulse is outputted from the magnetic sensor 62. The missing of the detection pulse had not occurred until that time. As a result, in the storage section 82, the last pulse number is updated to "5", and the rotation direction is updated to the "leftward direction". From this state, the movable section 43 changes the rotation direction from the leftward direction to the rightward direction and rotated by approximately 150 degrees in the rightward direction. While the movable section 43 is rotated by approximately 150 degrees in the rightward direction, firstly, the magnets 53, 52 and 51 respectively approach the magnetic sensors 62, 63 and 61 in order, however, the magnetization directions of the magnetic sensors 62, 63 and 61 are not inverted by addition of the magnetic fields in the same directions. Subsequently, when the magnet 54 approaches the magnetic sensor 62, the magnetization direction of the magnetic sensor 62 is inverted, however, the detection pulse to be outputted from the magnetic sensor 62 is missed. Subsequently, the magnet 53 approaches the magnetic sensor 63, the magnetization direction of the magnetic sensor 63 is inverted, and the positive directional detection pulse is outputted from the magnetic sensor 63.

The rotation detecting process in this case is as follows. Namely, since the output source of the present detection pulse is the magnetic sensor 63 and the direction of the pulse is positive, the deciding section 81 decides that the present pulse number is "3". Subsequently, since the present pulse number is "3" and the last pulse number is "5", the deciding section 81 subtracts the last pulse number from the present pulse number and decides that the pulse comparison value is 4 (although −2 is obtained by subtracting "5" from "3", a value obtained by adding 6 to this value is used as the pulse comparison value in the case where the result of subtraction is the negative value). Subsequently, in a case where the pulse comparison value is 4 and the rotation direction information is the "leftward direction" (step S1: NO, step S3: NO, step S12: NO in FIG. 4, step S18: YES, step S19: NO, step S21: NO in FIG. 6), the deciding section 81 decides that the rotation direction of the movable section 43 at the time when the present detection pulse is outputted is the "unidentified" and sets 1 as the first adjustment value to the rotation change amount (step S22 in FIG. 6, a process number P8 in FIG. 8). Subsequently, the deciding section 81 updates the last pulse number to "3", increases the rotation amount detection value by 1, and updates the rotation direction information to the "unidentified".

Incidentally, in this process, 1 set to the rotation change amount is the first adjustment value for effectively and appropriately executing the rotation detecting process according to the present embodiment. If the present invention is applied to the rotation detecting apparatus having n magnetic sensors, the first adjustment value is (n−1)/2.

(Missing Complementing Process C)

For instance, last time, the movable section 43 is rotated by approximately 60 degrees in the rightward direction, in the meantime, firstly, the magnet 54 approaches the magnetic sensor 62, and the magnetization direction of the magnetic sensor 62 is inverted, however, the detection pulse to be outputted from the magnetic sensor 62 is missed. Subsequently, the magnet 53 approaches the magnetic sensor 63, the magnetization direction of the magnetic sensor 63 is inverted, and the positive directional detection pulse is outputted from the magnetic sensor 63. As a result, in the storage section 82, the last pulse number is updated to "3", and the rotation direction is updated to the "unidentified". From this state, the movable section 43 is rotated by approximately 30 degrees in the rightward direction, the magnet 52 approaches the magnetic sensor 61, the magnetization direction of the magnetic sensor 61 is inverted, and the negative directional detection pulse is outputted from the magnetic sensor 61.

The rotation detecting process in this case is as follows. Namely, since the output source of the present detection pulse is the magnetic sensor 61 and the direction of the pulse is negative, the deciding section 81 decides that the present pulse number is "4". Subsequently, since the present pulse number is "4" and the last pulse number is "3", the deciding section 81 subtracts the last pulse number from the present pulse number and decides that the pulse comparison value is 1. Subsequently, in a case where the pulse comparison value is 1 and the rotation direction information is the "unidentified" (step S1: NO, step S3: YES, step S4: NO, step S9: NO in FIG. 4), the deciding section 81 decides that the rotation direction of the movable section 43 at the time when the present detection pulse is outputted is the "rightward direction" and sets 4 as a second adjustment value to the rotation change amount (step S11 in FIG. 4, a process number P9 in FIG. 8). Subsequently, the deciding section 81 updates the last pulse number to "4", increases the rotation amount detection value by 4, and updates the rotation direction information to the "rightward direction".

Incidentally, in this process, 4 set to the rotation change amount is the second adjustment value for effectively and appropriately executing the rotation detecting process according to the present embodiment. If the present invention is applied to the rotation detecting apparatus having n magnetic sensors, the second adjustment value is (n+5)/2.

(Missing Complementing Process D)

For instance, last time, the movable section 43 is rotated by approximately 60 degrees in the leftward direction, in the meantime, firstly, the magnet 54 approaches the magnetic sensor 62, and the magnetization direction of the magnetic sensor 62 is inverted, however, the detection pulse to be outputted from the magnetic sensor 62 is missed. Subsequently, the magnet 51 approaches the magnetic sensor 61, the magnetization direction of the magnetic sensor 61 is inverted, and the positive directional detection pulse is outputted from the magnetic sensor 61. As a result, in the storage section 82, the last pulse number is updated to "1", and the rotation direction is updated to the "unidentified". From this state, the movable section 43 is rotated by approximately 30 degrees in the leftward direction, the magnet 52 approaches the magnetic sensor 63, the magnetization direction of the magnetic sensor 63 is inverted, and the negative directional detection pulse is outputted from the magnetic sensor 63.

The rotation detecting process in this case is as follows. Namely, since the output source of the present detection pulse is the magnetic sensor 63 and the direction of the pulse is negative, the deciding section 81 decides that the present pulse number is "6". Subsequently, since the present pulse number is "6" and the last pulse number is "1", the deciding section 81 subtracts the last pulse number from the present pulse number and decides that the pulse comparison value is 5. Subsequently, in a case where the pulse comparison value is 5 and the rotation direction information is the "unidentified" (step S1: NO, step S3: YES, step S4: NO, step S9: NO in FIG. 4), the deciding section 81 decides that the rotation direction of the movable section 43 at the time when the present detection pulse is outputted is the "leftward direction" and sets −4 as the second adjustment value to the rotation change amount (step S11 in FIG. 4, a process number P10 in FIG. 8). Subsequently, the deciding section 81 updates the last pulse number to "6", decreases the rotation amount detection value by 4, and updates the rotation direction information to the "leftward direction".

Incidentally, in this process, −4 set to the rotation change amount is the second adjustment value for effectively and appropriately executing the rotation detecting process according to the present embodiment. If the present invention is applied to the rotation detecting apparatus having n magnetic sensors, the second adjustment value is −(n+5)/2.

Here, adjustment of the rotation amount detection value of the movable section 43 by using the above-mentioned first adjustment value and the second adjustment value will be described. Namely, at the time when the detection pulse is outputted from any one of the magnetic sensors 61, 62 and 63 after the missing of the detection pulse occurs, the rotation direction of the movable section 43 is decided as "unidentified", and the first adjustment value (−1 or 1) is set to the rotation change amount according to whether the rotation direction information stored in the storage section 82 at that time is the "rightward direction" or the "leftward direction". Subsequently, the rotation change amount to which the first adjustment value is set is added to the rotation amount detection value, thereby adjusting the rotation amount detection value. The above-mentioned missing complementing processes A and B are examples of this adjustment. After that, at the time when the detection pulse is outputted from any one of the magnetic sensors 61, 62 and 63, when the rotation direction of the movable section 43 is decided as the "rightward direction" or the "leftward direction", the second adjustment value (4 or −4) is set to the rotation change amount according to decision of the "rightward direction" or the "leftward direction". Subsequently, the rotation change amount to which the second adjustment value is set is added to the rotation amount detection value, thereby adjusting the rotation amount detection value. The above-mentioned missing complementing processes C and D are examples of this adjustment. After these two adjustments are carried, the rotation amount detection value becomes a value indicating the correct rotation amount of the movable section 43. Namely, the effect of the missing of the detection pulse is removed.

(Missing Complementing Process E)

For instance, last time, the movable section 43 is rotated by approximately 60 degrees in the leftward direction, in the meantime, firstly, the magnet 54 approaches the magnetic sensor 62, and the magnetization direction of the magnetic sensor 62 is inverted, however, the detection pulse to be outputted from the magnetic sensor 62 is missed. Subsequently, the magnet 51 approaches the magnetic sensor 61, the magnetization direction of the magnetic sensor 61 is inverted, and the positive directional detection pulse is outputted from the magnetic sensor 61. As a result, in the storage section 82, the last pulse number is updated to "1", and the rotation direction is updated to the "unidentified". From this state, the movable section 43 changes the rotation direction from the leftward direction to the rightward direction and is rotated by approximately 120 degrees in the rightward direction. While the movable section 43 is rotated by approximately 120 degrees in the rightward direction, firstly, the magnets 51, 54 and 53 respectively approach the magnetic sensors 61, 62 and 63 in order, however, the magnetization directions of the magnetic sensors 61, 62 and 63 are not inverted by addition of the magnetic fields in the same directions. Subsequently, when the magnet 52 approaches the magnetic sensor 61, the magnetization direction of the magnetic sensor 61 is inverted, and the negative directional detection pulse is outputted from the magnetic sensor 61.

The rotation detecting process in this case is as follows. Namely, since the output source of the present detection pulse is the magnetic sensor 61 and the direction of the pulse is negative, the deciding section 81 decides that the present pulse number is "4". Subsequently, since the present pulse number is "4" and the last pulse number is "1", the deciding section 81 subtracts the last pulse number from the present pulse number and decides that the pulse comparison value is 3. Subsequently, in a case where the pulse comparison value is 3 and the rotation direction information is the "unidentified" (step S1: NO, step S3: NO, step S12: YES in FIG. 4, step S13: NO, step S15: NO in FIG. 5), the deciding section 81 decides that the rotation direction of the movable section 43 at the time when the present detection pulse is outputted is the "unidentified inversion" and sets 0 to the rotation change amount (step S17 in FIG. 5, a process number P12 in FIG. 8). Subsequently, the deciding section 81 updates the last pulse number to "4", does not change the rotation amount detection value, and updates the rotation direction information to the "unidentified inversion".

Incidentally, in this process, although 0 is set to the rotation change amount, if the present invention is applied to the rotation detecting apparatus having n magnetic sensors, 0 is also set to the rotation change amount.

(Missing Complementing Process F)

For instance, last time, after the rotation direction becomes the unidentified state due to the missing of the detection pulse, the movable section 43 changes the rotation direction from the leftward direction to the rightward direction and is rotated by approximately 120 degrees in the rightward direction. While the movable section 43 is rotated by approximately 120 degrees in the rightward direction, firstly, the magnets 51, 54 and 53 respectively approach the magnetic sensors 61, 62 and 63 in order, however, the magnetization directions of the magnetic sensors 61, 62 and 63 are not inverted by addition of the magnetic fields in the same directions. Subsequently, when the magnet 52 approaches the magnetic sensor 61, the magnetization direction of the magnetic sensor 61 is inverted, and the negative directional detection pulse is outputted from the magnetic sensor 61. As a result, in the storage section 82, the last pulse number is updated to "4", and the rotation direction is updated to the "unidentified inversion". From this state, the movable section 43 is rotated by approximately 30 degrees in the rightward direction, the magnet 51 approaches the magnetic sensor 62, the magnetization direction of the magnetic sensor 62 is inverted, and the positive directional detection pulse is outputted from the magnetic sensor 62.

The rotation detecting process in this case is as follows. Namely, since the output source of the present detection pulse is the magnetic sensor 62 and the direction of the pulse is positive, the deciding section 81 decides that the present pulse number is "5". Subsequently, since the present pulse number is "5" and the last pulse number is "4", the deciding section 81 subtracts the last pulse number from the present pulse number and decides that the pulse comparison value is 1. Subsequently, in a case where the pulse comparison value is 1 and the rotation direction information is the "unidentified inversion" (step S1: NO, step S3: YES, step S4: NO, step S9: YES in FIG. 4), the deciding section 81 decides that the rotation direction of the movable section 43 at the time when the present detection pulse is outputted is the "rightward direction" and sets 1 as a third adjustment value to the rotation change amount (step S10 in FIG. 4, a process number P13 in FIG. 8). Subsequently, the deciding section 81 updates the last pulse number to "5", increases the rotation amount detection value by 1, and updates the rotation direction information to the "rightward direction".

Incidentally, in this process, 1 set to the rotation change amount is the third adjustment value for effectively and appropriately executing the rotation detecting process according to the present embodiment. If the present invention is applied to the rotation detecting apparatus having n magnetic sensors, the third adjustment value is (n−1)/2.

(Missing Complementing Process G)

For instance, last time, after the rotation direction becomes the unidentified state due to the missing of the detection pulse, the movable section 43 changes the rotation direction from the rightward direction to the leftward direction and is rotated by approximately 120 degrees in the leftward direction. While the movable section 43 is rotated by approximately 120 degrees in the leftward direction, firstly, the magnets 51, 52 and 53 respectively approach the magnetic sensors 62, 61 and in order, however, the magnetization directions of the magnetic sensors 62, 61 and 63 are not inverted by addition of the magnetic fields in the same directions. Subsequently, when the magnet 54 approaches the magnetic sensor 62, the magnetization direction of the magnetic sensor 62 is inverted, and the negative directional detection pulse is outputted from the magnetic sensor 62. As a result, in the storage section 82, the last pulse number is updated to "2", and the rotation direction is updated to the "unidentified inversion". From this state, the movable section 43 is rotated by approximately degrees in the leftward direction. The magnet 51 approaches the magnetic sensor 61, the magnetization direction of the magnetic sensor 61 is inverted, and the positive directional detection pulse is outputted from the magnetic sensor 61.

The rotation detecting process in this case is as follows. Namely, since the output source of the present detection pulse is the magnetic sensor 61 and the direction of the pulse is positive, the deciding section 81 decides that the present pulse number is "1". Subsequently, since the present pulse number is "1" and the last pulse number is "2", the deciding section 81 subtracts the last pulse number from the present pulse number and decides that the pulse comparison value is 5 (although −1 is obtained by subtracting "2" from "1", a value obtained by adding 6 to this value is used as the pulse comparison value in the case where the result of subtraction is the negative value). Subsequently, in a case where the pulse comparison value is 5 and the rotation direction information is the "unidentified inversion" (step S1: NO, step S3: YES, step S4: NO, step S9: YES in FIG. 4), the deciding section 81 decides that the rotation direction of the movable section 43 at the time when the present detection pulse is outputted is the "leftward direction" and sets −1 as the third adjustment value to the rotation change amount (step S10 in FIG. 4, a process number P14 in FIG. 8). Subsequently, the deciding section 81 updates the last pulse number to "1", decreases the rotation amount detection value by 1, and updates the rotation direction information to the "leftward direction".

Incidentally, in this process, 1 set to the rotation change amount is the third adjustment value for effectively and appropriately executing the rotation detecting process according to the present embodiment. If the present invention is applied to the rotation detecting apparatus having n magnetic sensors, the third adjustment value is −(n−1)/2.

Here, adjustment of the rotation amount detection value of the movable section 43 by using the above-mentioned third adjustment value will be described. Namely, at the time when the detection pulse is outputted from any one of the magnetic sensors 61, 62 and 63 after the missing of the detection pulse occurs, the rotation direction of the movable section 43 is decided as "unidentified", and the first adjustment value (−1 or 1) is set to the rotation change amount according to whether the rotation direction information stored in the storage section 82 at that time is the "rightward direction" or the "leftward direction". Subsequently, the rotation change amount to which the first adjustment value is set is added to the rotation amount detection value, thereby adjusting the rotation amount detection value. The missing complementing processes A and B are examples of this adjustment. After that, when it is decided that the movable section 43 becomes the unidentified inversion state at the time when the detection pulse is outputted from any one of the magnetic sensors 61, 62 and 63, 0 is set to the rotation change amount, and consequently, the rotation change amount is not changed. After that, when the rotation direction of the movable section 43 is decided as the "rightward direction" or the "leftward direction" at the time when the detection pulse is outputted from any one of the magnetic sensors 61, 62 and 63, the third adjustment value (1 or −1) is set to the rotation change amount according to decision of the "rightward direction" or the "leftward direction". Subsequently, the rotation change amount to which the third adjustment value is set is added to the rotation amount detection value, thereby adjusting the rotation amount detection value. The missing complementing processes F and G are examples of this adjustment. After these two adjustments are carried, the rotation amount detection value becomes a value indicating the correct rotation amount of the movable section 43. Namely, the effect of the missing of the detection pulse is removed.

(Missing Complementing Process H)

For instance, last time, after the rotation direction becomes the unidentified state due to the missing of the detection pulse, the movable section 43 changes the rotation direction from the leftward direction to the rightward direction and is rotated by approximately 120 degrees in the rightward direction. While the movable section 40 is rotated by approximately 120 degrees in the rightward direction, firstly, the magnets 51, 54 and 53 respectively approach the magnetic sensors 61, 62 and 63 in order, however, the magnetization directions of the magnetic sensors 61, 62 and 63 are not inverted by addition of the magnetic fields in the same directions. Subsequently, when the magnet 52 approaches the magnetic sensor 61, the magnetization direction of the magnetic sensor 61 is inverted, and the negative directional detection pulse is outputted from the magnetic sensor 61. As a result, in the storage section 82, the last pulse number is updated to "4", and the rotation direction is updated to the "unidentified inversion". From this state, the movable section 43 changes the rotation direction from the rightward direction to the leftward direction and is rotated by approximately 120 degrees in the leftward direction. While the movable section 43 is rotated by approximately 120 degrees in the leftward direction, firstly, the magnets 52, 53 and 54 respectively approach the magnetic sensors 61, 63 and 62 in order, however, the magnetization directions of the magnetic sensors 61, 63 and 62 are not inverted by addition of the magnetic fields in the same directions. Subsequently, when the magnet 51 approaches the magnetic sensor 61, the magnetization direction of the magnetic sensor 61 is inverted, and the positive directional detection pulse is outputted from the magnetic sensor 61.

The rotation detecting process in this case is as follows. Namely, since the output source of the present detection pulse is the magnetic sensor 61 and the direction of the pulse is positive, the deciding section 81 decides that the present pulse number is "1". Subsequently, since the present pulse number is "1" and the last pulse number is "4", the deciding section 81 subtracts the last pulse number from the present pulse number and decides that the pulse comparison value is 3 (although −3 is obtained by subtracting "4" from "1", a value obtained by adding 6 to this value is used as the pulse comparison value in the case where the result of subtraction is the negative value). Subsequently, in a case where the pulse comparison value is 3 and the rotation direction information is the "unidentified inversion" (step S1: NO, step S3: NO, step S12: YES in FIG. 4, step S13: NO, step S15: YES in FIG. 5), the deciding section 81 decides that the rotation direction of the movable section 43 at the time when the present detection pulse is outputted is the "unidentified" and sets 0 to the rotation change amount (step S16 in FIG. 5, a process number P15 in FIG. 8). Subsequently, the deciding section 81 updates the last pulse number to "1", does not change the rotation amount detection value, and updates the rotation direction information to the "unidentified".

Incidentally, in this process, although 0 is set to the rotation change amount, if the present invention is applied to the rotation detecting apparatus having n magnetic sensors, 0 is also set to the rotation change amount.

(Missing Complementing Process I)

For instance, last time, the movable section 43 is rotated by approximately 60 degrees in the rightward direction, in the meantime, firstly, the magnet 53 approaches the magnetic sensor 62, the magnetization direction of the magnetic sensor 62 is inverted, and the positive directional detection pulse is outputted from the magnetic sensor 62. As a result, in the storage section 82, the last pulse number is updated to "5", and the rotation direction is updated to the "rightward direction". Subsequently, the magnet 52 approaches the magnetic sensor 63, and the magnetization direction of the magnetic sensor 63 is inverted, however, the detection pulse to be outputted from the magnetic sensor 63 is missed. After that, the movable section 43 changes the rotation direction from the rightward direction to the leftward direction and is rotated by approximately 120 degrees in the leftward direction. While the movable section 43 is rotated by approximately 120 degrees in the leftward direction, firstly, the magnets 52, 53 and 54 respectively approach the magnetic sensors 63, 62 and in order, however, the magnetization directions of the magnetic sensors 63, 62 and 61 are not inverted by addition of the magnetic fields in the same directions. Subsequently, when the magnet 51 approaches the magnetic sensor 63, the magnetization direction of the magnetic sensor 63 is inverted, and the positive directional detection pulse is outputted from the magnetic sensor 63.

The rotation detecting process in this case is as follows. Namely, since the output source of the present detection pulse is the magnetic sensor 63 and the direction of the pulse is positive, the deciding section 81 decides that the present pulse number is "3". Subsequently, since the present pulse number is "3" and the last pulse number is "5", the deciding section 81 subtracts the last pulse number from the present pulse number and decides that the pulse comparison value is 4 (although −2 is obtained by subtracting "5" from "3", a value obtained by adding 6 to this value is used as the pulse comparison value in the case where the result of subtraction is the negative value). Subsequently, in a case where the pulse comparison value is 4 and the rotation direction information is the "rightward direction" (step S1: NO, step S3: NO, step S12: NO in FIG. 4, step S18: YES, step S19: NO, step S21: YES in FIG. 6), the deciding section 81 decides that the rotation direction of the movable section 43 at the time when the present detection pulse is outputted is the "leftward direction", and the rotation change amount is −2 (step S20 in FIG. 6, a process number P18 in FIG. 8). Subsequently, the deciding section 81 updates the last pulse number to "3", decreases the rotation amount detection value by 2, and updates the rotation direction information to the "leftward direction".

Incidentally, if the present invention is applied to the rotation detecting apparatus having n magnetic sensors, in this process, it is decided that the rotation change amount is −(n−1).

(Missing Complementing Process J)

For instance, last time, the movable section 43 is rotated by approximately 60 degrees in the rightward direction, in the meantime, firstly, the magnet 52 approaches the magnetic sensor 63, and the magnetization direction of the magnetic sensor 63 is inverted, however, the detection pulse to be outputted from the magnetic sensor 63 is missed. Subsequently, the magnet 51 approaches the magnetic sensor 61, the magnetization direction of the magnetic sensor 61 is inverted and the positive directional detection pulse is outputted from the magnetic sensor 61. As a result, in the storage section 82, the last pulse number is updated to "1", and the rotation direction is updated to the "unidentified". From this state, the movable section 43 changes the rotation direction from the rightward direction to the leftward direction and is rotated by approximately 150 degrees in the leftward direction. While the movable section 43 is rotated by approximately 150 degrees in the leftward direction, firstly, the magnets 51, 52 and 53 respectively approach the magnetic sensors 61, 63 and 62 in order, however, the magnetization directions of the magnetic sensors 61, 63 and 62 are not inverted by addition of the magnetic fields in the same directions. Subsequently, when the magnet 54 approaches the magnetic sensor 61, the magnetization direction of the magnetic sensor 61 is inverted, however, the detection pulse to be outputted from the magnetic sensor 61 is missed. Subsequently, when the magnet 51 approaches the magnetic sensor 63, the magnetization direction of the magnetic sensor 63 is inverted, and the positive directional detection pulse is outputted from the magnetic sensor 63.

The rotation detecting process in this case is as follows. Namely, since the output source of the present detection pulse is the magnetic sensor 63 and the direction of the pulse is positive, the deciding section 81 decides that the present pulse number is "3". Subsequently, since the present pulse number is "3" and the last pulse number is "1", the deciding section 81 subtracts the last pulse number from the present pulse number and decides that the pulse comparison value is 2. Subsequently, in a case where the pulse comparison value is 2 and the rotation direction information is the "unidentified" (step S1: NO, step S3: NO, step S12: NO in FIG. 4, step S18: NO, step S23: NO in FIG. 6), the deciding section 81 decides that the rotation direction of the movable section 43 at the time when the present detection pulse is outputted is the "leftward direction", and the rotation change amount is −1 (step S25 in FIG. 6, a process number P19 in FIG. 9). Subsequently, the deciding section 81 updates the last pulse number to "3", decreases the rotation amount detection value by 1, and updates the rotation direction information to the "leftward direction".

Incidentally, if the present invention is applied to the rotation detecting apparatus having n magnetic sensors, in this process, it is decided that the rotation change amount is −(n−1−(n−1)/2).

(Missing Complementing Process K)

For instance, last time, immediately after the rotation direction becomes the unidentified state due to the missing of the detection pulse, the movable section 43 changes the rotation direction from the leftward direction to the rightward direction and is rotated by approximately 120 degrees in the rightward direction. While the movable section 43 is rotated by approximately 120 degrees in the rightward direction, firstly, the magnets 54, 53 and 52 respectively approach the magnetic sensors 61, 62 and 63 in order, however, the magnetization directions of the magnetic sensors 61, 62 and 63 are not inverted by addition of the magnetic fields in the same directions. Subsequently, when the magnet 51 approaches the magnetic sensor 61, the magnetization direction of the magnetic sensor 61 is inverted, and the positive directional detection pulse is outputted from the magnetic sensor 61. As a result, in the storage section 82, the last pulse number is updated to "1", and the rotation direction is updated to the "unidentified inversion". After that, the movable section 43 is rotated by approximately 60 degrees in the rightward direction, in the meantime, firstly, when the magnet 54 approaches the magnetic sensor 62, the magnetization direction of the magnetic sensor 62 is inverted. However, the detection pulse to be outputted from the magnetic sensor 62 is missed. Subsequently, when the magnet 53 approaches the magnetic sensor 63, the magnetization direction of the magnetic sensor 63 is inverted, and the positive directional detection pulse is outputted from the magnetic sensor 63.

The rotation detecting process in this case is as follows. Namely, since the output source of the present detection pulse is the magnetic sensor 63 and the direction of the pulse is positive, the deciding section 81 decides that the present pulse number is "3". Subsequently, since the present pulse number is "3" and the last pulse number is "1", the deciding section 81 subtracts the last pulse number from the present pulse number and decides that the pulse comparison value is 2. Subsequently, in a case where the pulse comparison value is 2 and the rotation direction information is the "unidentified inversion" (step S1: NO, step S3: NO, step S12: NO in FIG. 4, step S18: NO, step S23: YES in FIG. 6), the deciding section 81 decides that the rotation direction of the movable section 43 at the time when the present detection pulse is outputted is the "unidentified" and sets −1 as a fourth adjustment value to the rotation change amount (step S24 in FIG. 6, a process number P21 in FIG. 8). Subsequently, the deciding section 81 updates the last pulse number to "3", decreases the rotation amount detection value by 1, and updates the rotation direction information to the "unidentified".

Incidentally, if the present invention is applied to the rotation detecting apparatus having n magnetic sensors, in this process, −1 as the fourth adjustment value is set to the rotation change amount.

(Missing Complementing Process L)

For instance, last time, the movable section 43 is rotated by approximately 30 degrees in the rightward direction, the magnet 51 approaches the magnetic sensor 61, the magnetization direction of the magnetic sensor 61 is inverted, and the positive directional detection pulse is outputted from the magnetic sensor 61. As a result, in the storage section 82, the last pulse number is updated to "1", and the rotation direction is updated to the "rightward direction". After that, the movable section 43 changes the rotation direction from the rightward direction to the leftward direction and is rotated by approximately 120 degrees in the leftward direction. In the meantime, firstly, the magnets 51, 52 and 53 respectively approach the magnetic sensors 61, 63 and 62 in order, however, the magnetization directions of the magnetic sensors 61, 63 and 62 are not inverted by addition of the magnetic fields in the same directions. Subsequently, the magnet 54 approaches the magnetic sensor 61, and the magnetization direction of the magnetic sensor 61 is inverted, however, the detection pulse to be outputted from the magnetic sensor 61 is missed. After that, the movable section 43 changes the rotation direction from the leftward direction to the rightward direction and is rotated by approximately 120 degrees in the rightward direction. In the meantime, the magnets 54, 53 and 52 respectively approach the magnetic sensors 61, 62 and 63 in order, however, the magnetization directions of the magnetic sensors 61, 62 and 63 are not inverted by addition of the magnetic fields in the same directions. Subsequently, the magnet 51 approaches the magnetic sensor 61, the magnetization direction of the magnetic sensor 61 is inverted, and the positive directional detection pulse is outputted from the magnetic sensor 61.

The rotation detecting process in this case is as follows. Namely, since the output source of the present detection pulse is the magnetic sensor 61 and the direction of the pulse is positive, the deciding section 81 decides that the present pulse number is "1". Subsequently, since the present pulse number is "1" and the last pulse number is "1", the deciding section 81 subtracts the last pulse number from the present pulse number and decides that the pulse comparison value is 0. Subsequently, in a case where the pulse comparison value is 0 and the rotation direction information is the "rightward direction" (step S1: YES in FIG. 4), the deciding section 81 decides that the rotation direction of the movable section 43 at the time when the present detection pulse is outputted is the "rightward direction", and the rotation change amount is 0 (step S2 in FIG. 4, a process number P25 in FIG. 8). Subsequently, the deciding section 81 updates the last pulse number to "1", does not change the rotation amount detection value, and maintains the rotation direction information of the "rightward direction".

Incidentally, if the present invention is applied to the rotation detecting apparatus having n magnetic sensors, in this process, it is decided that the rotation amount detection value is 0.

Twelve missing complementing processes are described above, and further, some other missing complementing processes which are not described above are illustrated in FIG. 8 or 9. These undescribed missing complementing processes can be sufficiently understood by viewing FIG. 8 or 9 after understanding the twelve missing complementing processes described above.

(Error Process)

If the pulse comparison value is 1 and the rotation direction information is the "leftward direction", or if the pulse comparison value is 5 and the rotation direction information is the "rightward direction", the deciding section 81 decides an error, for example, to stop the rotation detecting process and to correct the rotation direction and the rotation amount of the movable section 43 by other correcting means. With respect to the other correcting means when the error occurs, explanation is omitted.

As explained above, in accordance with the rotation detecting apparatus 31 according to the embodiment of the present invention, in the missing complementing process, it is possible to decide the rotation direction and the rotation amount of the movable section 43 without using the detection pulse two times before. Therefore, it is possible to reduce information required to carry out processes of deciding the rotation direction and the rotation amount of the movable section 43 and to reduce the storage area of the storage element used for this process.

Some effects taken by the rotation detecting apparatus 31 according to the embodiment of the present invention will be concretely described as compared with the conventional technique. Namely, the first example of the above-mentioned missing complementing process in the rotation detecting apparatus 300 (the rotation detecting apparatus described in Patent Document 1) according to the conventional technique and the above-described missing complementing processes A and C in the rotation detecting apparatus 31 according to the embodiment of the present invention are common in aspects of the motion of the movable section. In addition, the second example of the above-mentioned missing complementing process in the rotation detecting apparatus 300 according to the conventional technique and the above-described missing complementing processes B and C in the rotation detecting apparatus 31 according to the embodiment of the present invention are opposite in the rotation direction, but are common in aspects of the motion of the movable section. In addition, the third example of the above-mentioned missing complementing process in the rotation detecting apparatus 300 according to the conventional technique and the above-described missing complementing processes F in the rotation detecting apparatus 31 according to the embodiment of the present invention are common in aspects of the motion of the movable section.

In comparison between the missing complementing processes according to the conventional technique and the missing complementing processes according to the embodiment of the present invention, the missing complementing processes according to the conventional technique has the processes of: storing the information indicating whether or not there is the missing of the detection pulse; subtracting, on the basis of this information, the number of the detection pulse two times before from the present detection pulse in a case of recognizing that the missing of the detection pulse occurs; and using the value obtained thereby to calculate the correct rotation change amount of the movable section. According to this, in the rotation detecting apparatus 300 according to the conventional technique, it is necessary to always retain the detection pulse two times before and to update the detection pulse two times before using the last detection pulse for whenever new detection pulse is outputted. Therefore, in order to retain and update the detection pulse two times before, it is necessary to reserve the storage area for storing the variable inputted from the outside in the storage element.

On the other hand, in the missing complementing processes according to the embodiment of the present invention, the "rightward direction", "leftward direction", "unidentified" and "unidentified inversion" are stored as the rotation direction information. The missing complementing processes according to the embodiment of the present invention has the processes of: setting the rotation direction information to the "unidentified" when recognizing that the missing of the detection pulse occurs; and subsequently, adjusting the rotation change amount of the movable section 43 using the first adjustment value if the rotation direction information is the "unidentified"; and subsequently, adjusting the rotation change amount of the movable section 43 using the second adjustment value if the rotation direction information is changed from the "unidentified" to the "rightward direction" or the "leftward direction", thereby calculating the correct rotation change amount of the movable section 43. In addition, the missing complementing processes according to the embodiment of the present invention has the processes of: updating the rotation direction information from the "unidentified" to the "unidentified inversion" if the movable section 43 which had become the unidentified state due to occurrence of the missing of the detection pulse changes the rotation direction; and subsequently, setting the rotation change amount of the movable section 43 to 0 if the rotation direction information is the "unidentified inversion"; and subsequently, adjusting the rotation change amount of the movable section 43 using the third adjustment value if the rotation direction information is changed from the "unidentified inversion" to the "rightward direction" or the "leftward direction", thereby calculating the correct rotation change amount of the movable section 43. Moreover, if the missing of the detection pulse occurs while the movable section 43 in the unidentified inversion state is rotated to the rightward direction or the leftward direction, or alternatively, if the missing of the detection pulse occurs immediately after the movable section 43 in the unidentified inversion state has changed the rotation direction to the rightward direction or the leftward direction, the rotation change amount of the movable section 43 is adjusted using the fourth adjustment value, thereby calculating the correct rotation change amount of the movable section 43.

Here, in the embodiment of the present invention, the first adjustment value is −1 or 1, the second adjustment value is 4 or −4, and the third adjustment value is 1 or −1. The first adjustment value, the second adjustment value and the third adjustment value are constant values determined according to the number of the magnetic sensors. Furthermore, the fourth adjustment value is 1 or −1. This value is also a constant value. Therefore, these adjustment values can be defined as constants in the computer program for executing the missing complementing processes. In other words, in the rotation detecting apparatus 31 according to the embodiment of the present invention, it is not necessary to reserve the storage area for storing any variables inputted from the outside in the storage element in order to store the first adjustment value, the second adjustment value, the third adjustment value and the fourth adjustment value. Therefore, in accordance with the rotation detecting apparatus 31 according to the embodiment of the present invention, as compared with the conventional technique, it is possible to reduce the storage area for storing variables inputted from outside in the storage element by the data size (e.g. 3 bits) of the detection pulse two times before.

Incidentally, although, in the above-described embodiment, a case of providing the three magnetic sensors 61, 62 and 63 is cited as an example, as mentioned some times in the description of the above-described embodiment, the number of the magnetic sensors may be four or more. Moreover, although, in the above-described embodiment, a case of providing the four (two pairs of) magnets 51, 52, 53 and 54 is cited as an example, the number of the magnets may be two (one pair) or six (three pairs) or more.

Figure 13:
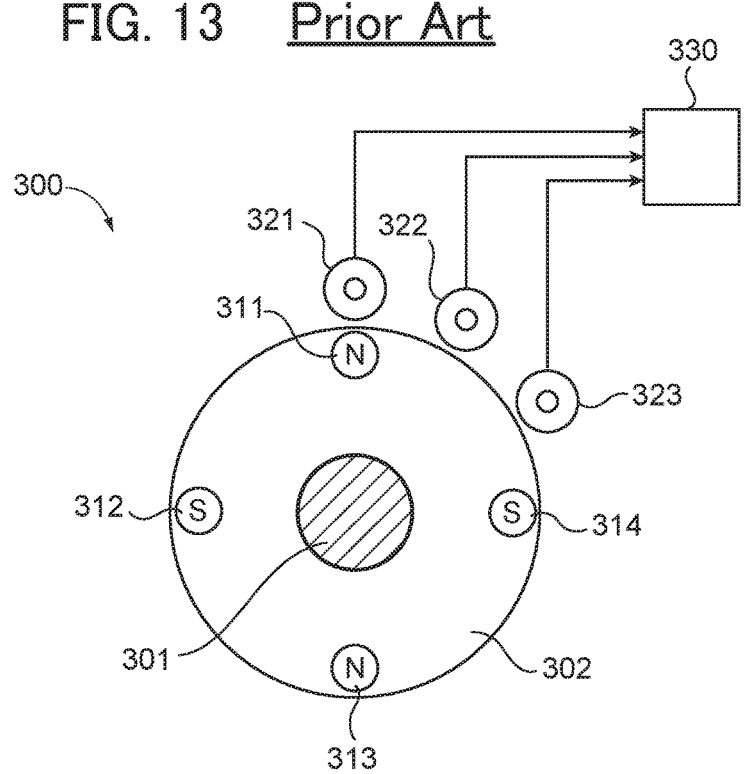
FIG. 13 It is an explanatory drawing showing another rotation detecting apparatus.

Moreover, although, in the above-described embodiment, a case of locating the four magnets 51, 52, 53 and 54 at intervals of 90 degrees and locating the three magnetic sensors 61, 62 and 63 at intervals of 120 degrees is cited as an example, the present invention is not restricted by this. For instance, as shown in FIG. 13, the four magnets may be located at intervals of 90 degrees and the three magnetic sensors may be located at intervals of 30 degrees in a part in the periphery of the movable section. In other words, it is possible to actualize the missing complementing process without using the detection pulse two times before and reduce the storage area of the storage element used for the missing complementing process, in the rotation detecting apparatus 300 shown in FIG. 13, by applying the missing complementing processes of the present invention to the configuration having the location of the magnets and the magnetic sensors of the rotation detecting apparatus 300, instead of the missing complementing processes of the conventional technique.

Figure 10:
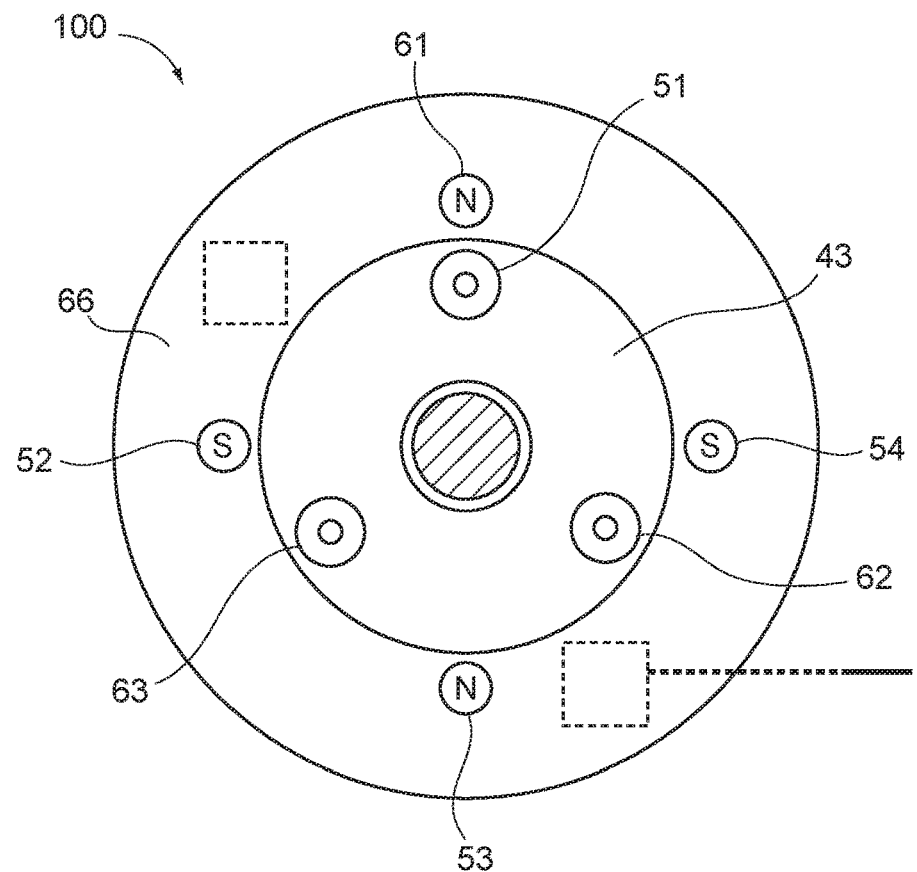
FIG. 10 It is an explanatory drawing showing a rotation detecting apparatus in accordance with another embodiment of the present invention.

Moreover, although, in the above-described embodiment, a case of providing the magnets 51, 52, 53 and 54 in the movable section 43 and providing the magnetic sensors 61, 62 and 63 in the periphery of the movable section 43 is cited as an example, the present invention is not restricted by this. For instance, as a rotation detecting apparatus 100 shown in FIG. 10, the magnetic sensors 61, 62 and 63 may be provided in the movable section 43 and the magnets 51, 52, 53 and 54 may be provided in the periphery of the movable section 43. In this case, ones of changing the positions together with the movable section 43 are magnetic sensors 61, 62 and 63, and the magnets 51, 52, 53 and 54 do not change their positions.

Figure 11:
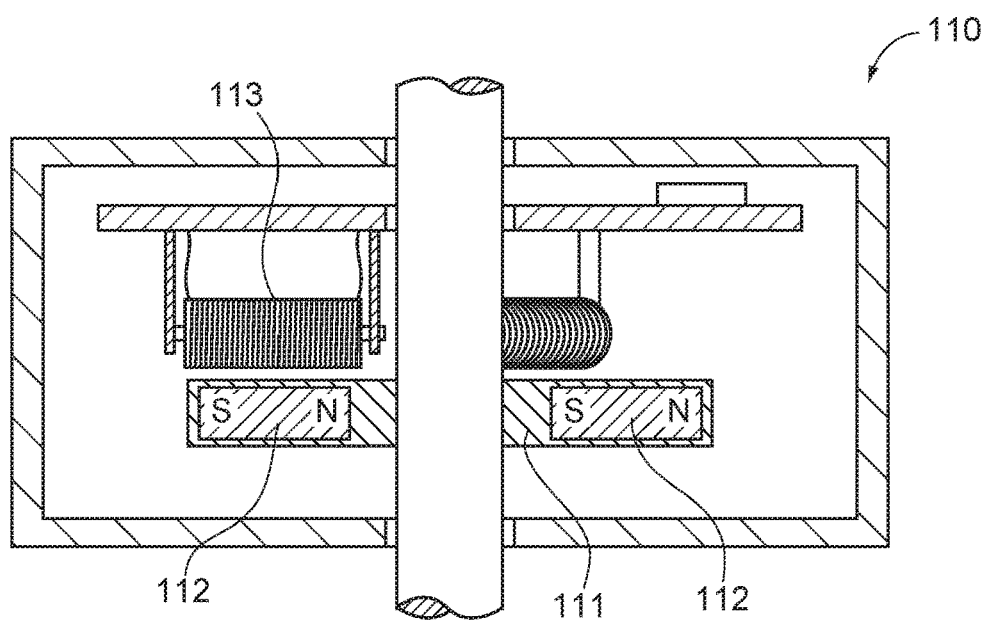
FIG. 11 It is an explanatory drawing showing a rotation detecting apparatus in accordance with a further embodiment of the present invention.

Moreover, although, in the above-described embodiment, a case of setting the location of the magnets 51, 52, 53 and 54 and the magnetic sensors 61, 62 and 63 in such a way that any one of the magnets 51, 52, 53 and 54 faces to any one of the magnetic sensors 61, 62 and 63 in a diameter direction of the movable section 43 by the rotation of the movable section 43 is cited as an example, the present invention is not restricted by this. For instance, as a rotation detecting apparatus 110 shown in FIG. 11, the location of magnets 112 and magnetic sensors 113 may be set in such a way that any one of four magnets 112 (only two are illustrated in FIG. 11) faces to any one of magnetic sensors 113 in a direction parallel to a rotation axial line of a movable section 111 by the rotation of the movable section 111.

Figure 12:
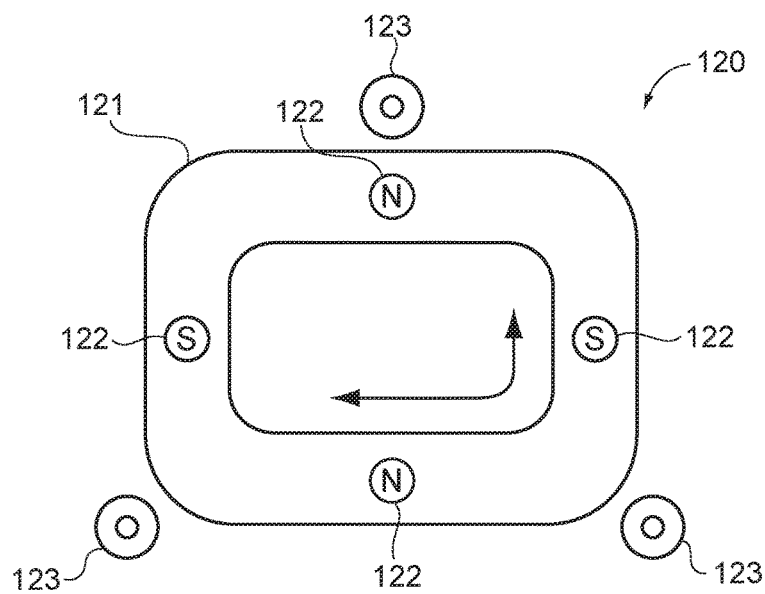
FIG. 12 It is an explanatory drawing showing a circulating motion detecting apparatus in accordance with an embodiment of the present invention.

Moreover, although, in the above-described embodiment, the rotation detecting apparatus of detecting the rotation direction and the rotation amount of the detected object is cited as an example, the present invention is not restricted by this. For instance, as a circulating motion detecting apparatus 120 shown in FIG. 12, the present information may be applied to a motion detecting apparatus in which a plurality of pairs of magnets 122 are provided in a movable section 121 of carrying out circulating motion together with a detected object and three or more magnetic sensors 123 are provided in the periphery of the movable section 121.

Moreover, the present invention may be suitably varied within range of summary or idea of the invention been readable from the claims and the whole of the specification and a motion detecting apparatus having such variation is also included in technical idea of the present invention.

DESCRIPTION OF SYMBOLS 31, 100, 100, 300 rotation detecting apparatus (motion detecting apparatus)
32, 301 rotation shaft (detected object)
43, 111, 121, 312 movable section
51, 52, 53, 54, 112, 122 magnet (magnetic field generating section)
61, 62, 63, 113, 123 magnetic sensor (magnetic field detecting section)
64, composite magnetic wire
65 coil
66 substrate
68 rotation detecting circuit (motion detecting circuit)
81 deciding section (operation processing section, update processing section)
82 storage section
83 power source voltage generating circuit
120 circulating motion detecting apparatus (motion detecting apparatus)

The invention claimed is:
1. A motion detecting apparatus for detecting rotating motion of a detected object, comprising:
a movable section fixed to the detected object and rotating according to the rotating motion of the detected object;
at least one pair of magnets located in the movable section to respectively generate magnetic fields in different directions from each other;
n magnetic sensors, wherein n is an integer 3 or more, located in a vicinity of the movable section, wherein any one of the n magnetic sensors changes a magnetization direction thereof and outputs a positive detection pulse when one of said at least one pair of magnets approaches said any one of the n magnetic sensors, and said any one of the n magnetic sensors changes the magnetization direction thereof and outputs a negative detection pulse when another of said at least one pair of magnets approaches said any one of the n magnetic sensors; and a motion detecting circuit having a storage section, receiving detection pulses outputted from the n magnetic sensors, and detecting a state of the rotating motion of the detected object on a basis of the received detection pulses, wherein said at least one pair of magnets and the n magnetic sensors are located so that detection pulses in respective one of a positive direction and a negative direction are continuously outputted one by one at different timings from the respective n magnetic sensors while the movable section rotates in one direction, and subsequently, detection pulses in respective another of the positive direction and the negative direction are continuously outputted one by one at different timings from the respective n magnetic sensors while the movable section further rotates in said one direction, and thereby, a constant output pattern composed of 2n detection pulses is formed, wherein each one of the 2n detection pulses composing the output pattern is different from any other of the 2n detection pulses composing the output pattern with respect to a direction of a detection pulse, a magnetic sensor from which the detection pulse is outputted, or both the direction of the detection pulse and the magnetic sensor from which the detection pulse is outputted, wherein the motion detecting circuit assigns numbers of 1, 2, ..., n, n+1, n+2, ..., 2n to the 2n detection pulses composing the output pattern in order of outputs of the 2n detection pulses while the movable section rotates said one direction, wherein the storage section stores a number of a last detection pulse outputted from any one of the n magnetic sensors, motion direction information indicating that a motion direction of the movable section at a time when the last detection pulse is outputted is said one direction, another direction, an unidentified state, or an unidentified inversion state, wherein the unidentified inversion state is an inversion in the unidentified state, and a motion amount detection value indicating a motion amount of the movable section at the time when the last detection pulse is outputted, wherein the motion detecting circuit decides whether the motion direction of the movable section at a time when a present detection pulse is outputted from any one of the n magnetic sensors is said one direction, said another direction, the unidentified state or the unidentified inversion state, and decides or sets the motion amount of the movable section at the time when the present detection pulse is outputted on a basis of (i) a difference between a number of the present detection pulse and the number of the last detection pulse, (ii) the motion direction information, and (iii) the motion amount detection value, and wherein the motion detecting circuit updates the number of the last detection pulse stored in the storage section on a basis of the number of the present detection pulse, updates the motion direction information stored in the storage section on a basis of a decision with respect to the motion direction of the movable section at the time when the present detection pulse is outputted, and updates the motion amount detection value stored in the storage section on a basis of a decision or setting with respect to the motion amount of the movable section at the time when the present detection pulse is outputted.

2. The motion detecting apparatus according to claim 1, wherein:

the motion detecting circuit calculates a comparison value by subtracting the number of the last detection pulse from the number of the present detection pulse, wherein, if a value obtained by subtracting the number of the last detection pulse from the number of the present detection pulse is a negative value, a value is taken by adding 2n to the obtained value as the comparison value, decides, if the comparison value is 1 and the motion direction information indicates said one direction, that the motion direction of the movable section at the time when the present detection pulse is outputted is said one direction, and a change value of the motion amount of the movable section at the time when the present detection pulse is outputted is +1, decides, if the comparison value is 2n−1 and the motion direction information indicates said another direction, that the motion direction of the movable section at the time when the present detection pulse is outputted is said another direction, and the change value of the motion amount of the movable section at the time when the present detection pulse is outputted is −1, decides, if the comparison value is n and the motion direction information indicates said one direction, that the motion direction of the movable section at the time when the present detection pulse is outputted is said another direction, and the change value of the motion amount of the movable section at the time when the present detection pulse is outputted is −n, decides, if the comparison value is n and the motion direction information indicates said another direction, that the motion direction of the movable section at the time when the present detection pulse is outputted is said one direction, and the change value of the motion amount of the movable section at the time when the present detection pulse is outputted is +n, decides, if the comparison value is 2 and the motion direction information indicates said one direction, that the motion direction of the movable section at the time when the present detection pulse is outputted is the unidentified state, and sets the change value of the motion amount of the movable section at the time when the present detection pulse is outputted to −(n−1)/2, decides, if the comparison value is n−1 and the motion direction information indicates said one direction, that the motion direction of the movable section at the time when the present detection pulse is outputted is the unidentified state, and sets the change value of the motion amount of the movable section at the time when the present detection pulse is outputted to −(n−1)/2, decides, if the comparison value is 2n−2 and the motion direction information indicates said another direction, that the motion direction of the movable section at the time when the present detection pulse is outputted is the unidentified state, and sets the change value of the motion amount of the movable section at the time when the present detection pulse is outputted to (n−1)/2, decides, if the comparison value is n+1 and the motion direction information indicates said another direction, that the motion direction of the movable section at the time when the present detection pulse is outputted is the unidentified state, and sets the change value of the motion amount of the movable section at the time when the present detection pulse is outputted to (n−1)/2, decides, if the comparison value is 1 and the motion direction information indicates the unidentified state, that the motion direction of the movable section at the time when the present detection pulse is outputted is said one direction, and sets the change value of the motion amount of the movable section at the time when the present detection pulse is outputted to (n+5)/2, and decides, if the comparison value is 2n−1 and the motion direction information indicates the unidentified state, that the motion direction of the movable section at the time when the present detection pulse is outputted is said another direction, and sets the change value of the motion amount of the movable section at the time when the present detection pulse is outputted to −(n+5)/2.

3. The motion detecting apparatus according to claim 2, wherein:

the motion detecting circuit decides, if the comparison value is n and the motion direction information indicates the unidentified state, that the motion direction of the movable section at the time when the present detection pulse is outputted is the unidentified inversion state, and sets the change value of the motion amount of the movable section at the time when the present detection pulse is outputted to 0, decides, if the comparison value is 1 and the motion direction information indicates the unidentified inversion state, that the motion direction of the movable section at the time when the present detection pulse is outputted is said one direction, and sets the change value of the motion amount of the movable section at the time when the present detection pulse is outputted to (n−1)/2, decides, if the comparison value is 2n−1 and the motion direction information indicates the unidentified inversion state, that the motion direction of the movable section at the time when the present detection pulse is outputted is said another direction, and sets the change value of the motion amount of the movable section at the time when the present detection pulse is outputted to −(n−1)/2, and decides, if the comparison value is n and the motion direction information indicates the unidentified inversion state, that the motion direction of the movable section at the time when the present detection pulse is outputted is the unidentified state, and sets the change value of the motion amount of the movable section at the time when the present detection pulse is outputted to 0.

4. The motion detecting apparatus according to claim 3, wherein:

the motion detecting circuit decides, if the comparison value is 2 and the motion direction information indicates the unidentified inversion state, that the motion direction of the movable section at the time when the present detection pulse is outputted is the unidentified state, and sets the change value of the motion amount of the movable section at the time when the present detection pulse is outputted to −1, decides, if the comparison value is n−1 and the motion direction information indicates the unidentified inversion state, that the motion direction of the movable section at the time when the present detection pulse is outputted is the unidentified state, and sets the change value of the motion amount of the movable section at the time when the present detection pulse is outputted to −1, decides, if the comparison value is 2n−2 and the motion direction information indicates the unidentified inversion state, that the motion direction of the movable section at the time when the present detection pulse is outputted is the unidentified state, and sets the change value of the motion amount of the movable section at the time when the present detection pulse is outputted to 1, and decides, if the comparison value is n+1 and the motion direction information indicates the unidentified inversion state, that the motion direction of the movable section at the time when the present detection pulse is outputted is the unidentified state, and sets the change value of the motion amount of the movable section at the time when the present detection pulse is outputted to 1.

5. The motion detecting apparatus according to claim 4, wherein:

the motion detecting circuit decides, if the comparison value is n−1 and the motion direction information indicates said another direction, that the motion direction of the movable section at the time when the present detection pulse is outputted is said one direction, and the change value of the motion amount of the movable section at the time when the present detection pulse is outputted is n−1, decides, if the comparison value is n+1 and the motion direction information indicates said one direction, that the motion direction of the movable section at the time when the present detection pulse is outputted is said another direction, and the change value of the motion amount of the movable section at the time when the present detection pulse is outputted is −(n−1), decides, if the comparison value is n−1 and the motion direction information indicates the unidentified state, that the motion direction of the movable section at the time when the present detection pulse is outputted is said another direction, and sets the change value of the motion amount of the movable section at the time when the present detection pulse is outputted to −(n−1−(n−1)/2), and decides, if the comparison value is n+1 and the motion direction information indicates the unidentified state, that the motion direction of the movable section at the time when the present detection pulse is outputted is said one direction, and sets the change value of the motion amount of the movable section at the time when the present detection pulse is outputted to n−1−(n−1)/2.

6. The motion detecting apparatus according to claim 5, wherein:

the motion detecting circuit decides, if the comparison value is 0 and the motion direction information indicates said one direction, that the motion direction of the movable section at the time when the present detection pulse is outputted is said one direction, and the change value of the motion amount of the movable section at the time when the present detection pulse is outputted is 0, decides, if the comparison value is 0 and the motion direction information indicates said another direction, that the motion direction of the movable section at the time when the present detection pulse is outputted is said another direction, and the change value of the motion amount of the movable section at the time when the present detection pulse is outputted is 0, decides, if the comparison value is 0 and the motion direction information indicates the unidentified state, that the motion direction of the movable section at the time when the present detection pulse is outputted is the unidentified state, and sets the change value of the motion amount of the movable section at the time when the present detection pulse is outputted to 0, and decides, if the comparison value is 0 and the motion direction information indicates the unidentified inversion state, that the motion direction of the movable section at the time when the present detection pulse is outputted is the unidentified inversion state, and sets the change value of the motion amount of the movable section at the time when the present detection pulse is outputted to 0.

7. The motion detecting apparatus according to claim 1, wherein:

each of the magnetic sensors has a magnetic element producing large Barkhausen effect and a coil wound around the magnetic element.

* * * * *